(12) United States Patent
Rotgans et al.

(10) Patent No.: US 11,409,762 B2
(45) Date of Patent: Aug. 9, 2022

(54) INTERACTIVELY CONSTRUCTING A QUERY AGAINST A DATASET

(71) Applicant: KONINKLIJKE PHILIPS N. V., Eindhoven (NL)

(72) Inventors: Niels Roman Rotgans, Boston, MA (US); Niels Laute, Venlo (NL); Elise Claude Valentine Talgorn, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 287 days.

(21) Appl. No.: 16/305,134

(22) PCT Filed: Jun. 16, 2017

(86) PCT No.: PCT/EP2017/064841
§ 371 (c)(1),
(2) Date: Nov. 28, 2018

(87) PCT Pub. No.: WO2017/216380
PCT Pub. Date: Dec. 21, 2017

(65) Prior Publication Data
US 2020/0327139 A1    Oct. 15, 2020

Related U.S. Application Data

(60) Provisional application No. 62/351,336, filed on Jun. 17, 2016.

(51) Int. Cl.
*G06F 16/26* (2019.01)
*G06F 16/248* (2019.01)
(Continued)

(52) U.S. Cl.
CPC .......... *G06F 16/26* (2019.01); *G06F 16/248* (2019.01); *G06F 16/2425* (2019.01); *G06F 16/904* (2019.01); *G06F 16/951* (2019.01)

(58) Field of Classification Search
CPC ...... G06F 16/26; G06F 16/148; G06F 16/904; G06F 16/2425; G06F 16/951
(Continued)

(56) References Cited

U.S. PATENT DOCUMENTS 7,149,983 B1    12/2006 Robertson et al.
10,114,884 B1 * 10/2018 Valensi ................. G06F 3/0482
(Continued)

FOREIGN PATENT DOCUMENTS

WO    2016122447 A1    8/2016

OTHER PUBLICATIONS

Anonymous: "Data Driven User Interface Auto-Generated From the System Ontology: Mitosystems", retrieved from the Internet: URL:http://mi tosystems.com/auto-generating-the-gui, Apr. 22, 2013, pp. 1-8.

*Primary Examiner* — Shahid A Alam

(57) ABSTRACT

Various embodiments described herein relate to a method, apparatus, and computer-readable medium including one or more of the following: displaying a first attribute display representative of a first attribute of a data set, the first attribute display comprising a first input element for receiving an indication of a first attribute value; displaying a second attribute display representative of a second attribute of the data set, the second attribute display comprising a second input element for receiving an indication of a second attribute value; receiving an indication of a first attribute value for the first attribute of a data set; and after receiving the indication of the first attribute value, altering the second input element of the second attribute display to reflect a portion of the data set matching a query including the first attribute value.

7 Claims, 15 Drawing Sheets

(51) Int. Cl.
  *G06F 16/242* (2019.01)
  *G06F 16/951* (2019.01)
  *G06F 16/904* (2019.01)
(58) Field of Classification Search
  USPC ........................................................ 707/722
  See application file for complete search history.

(56) References Cited

U.S. PATENT DOCUMENTS

| | | | |
|---|---|---|---|
| 2004/0015783 A1* | 1/2004 | Lennon | G06F 16/248 |
| | | | 715/255 |
| 2008/0154873 A1* | 6/2008 | Redlich | G06F 16/951 |
| | | | 707/999.005 |
| 2012/0089633 A1* | 4/2012 | Vigneau | G06F 16/951 |
| | | | 707/769 |
| 2012/0120086 A1 | 5/2012 | Dang et al. | |
| 2013/0031130 A1 | 1/2013 | Hahm | |
| 2014/0280004 A1* | 9/2014 | De Bellis | G06F 3/00 |
| | | | 707/706 |
| 2015/0134694 A1* | 5/2015 | Burke | G06Q 10/06398 |
| | | | 707/769 |
| 2016/0132953 A1* | 5/2016 | Davar | G06Q 30/0282 |
| | | | 705/26.7 |
| 2017/0132277 A1* | 5/2017 | Hsiao | G06Q 10/06 |
| 2019/0129906 A1* | 5/2019 | Keen | G06F 16/9024 |

\* cited by examiner

INTERACTIVELY CONSTRUCTING A QUERY AGAINST A DATASET

CROSS-REFERENCE TO PRIOR APPLICATIONS

This application is the U.S. National Phase application under 35 U.S.C. § 371 of International Application No. PCT/EP2017/064841, filed on Jun. 16, 2017, which claims the benefit of U.S. Provisional Application No. 62/351,336, filed Jun. 17, 2016. These applications are hereby incorporated by reference herein, for all purposes.

TECHNICAL FIELD

Various embodiments described herein relate to data access and more specifically, but not exclusively, to user interfaces for facilitating user exploration of a data set and query generation.

BACKGROUND

Data analysis has become a cornerstone of many fields, including hospital management, financial markets, customer analytics, etc. In many cases, a user may wish to query a database for records matching particular characteristics and then run particular analytics on that subset. For example, it can be powerful to be able to specify that revenues should be display only for patients ages 25-50 in the critical care department or cardiology department undergoing a particular procedure. Existing query languages or front end query forms can provide the user with the capability to construct desired queries and then submit them to the database to receive back the subsets for the performance of additional analytics.

SUMMARY

While structured query languages exist and work well when the user already knows what subset of the database they wish to analyze, these tools fall short in terms of allowing a user to explore the data set for determining which subset would be enlightening for running the analytics. As it is, many tools would require reformulation and submission of the query through multiple iterations until the user has found a subset they wish to use.

Accordingly, various embodiments described herein provide a user interface for constructing a query against a dataset in an interactive manner, with feedback during construction. For example, in some embodiments, a user is provided a graphical user interface (GUI) for selecting attributes and values to be added into a query. In some embodiments, when an attribute value is selected, the GUI is updated to display the effect the new selection has had on the data subset being selected. For example, in some embodiments an input element for a particular attributed value may be sized to indicate the relative number of records in the currently-selected subset that also match the attribute value tied to that input element; modification of the query (e.g., through activation of other input elements) may cause the size of that input element to change to reflect the new proportion of records in the subset matching that input element's attribute value. Various alternative methods, systems, and techniques for providing an interactive query interface with intra-construction feedback will be apparent in view of the various embodiments described herein.

Various embodiments described herein relate to a method comprising: displaying a first attribute display representative of a first attribute of a data set, the first attribute display comprising a first input element for receiving an indication of a first attribute value; displaying a second attribute display representative of a second attribute of the data set, the second attribute display comprising a second input element for receiving an indication of a second attribute value; receiving an indication of a first attribute value for the first attribute of a data set; and after receiving the indication of the first attribute value, altering the second input element of the second attribute display to reflect a portion of the data set matching a query including the first attribute value.

Various embodiments described herein relate to a device including a memory and a processor configured to display a first attribute display representative of a first attribute of a data set, the first attribute display comprising a first input element for receiving an indication of a first attribute value; display a second attribute display representative of a second attribute of the data set, the second attribute display comprising a second input element for receiving an indication of a second attribute value; receive an indication of a first attribute value for the first attribute of a data set; and after receiving the indication of the first attribute value, alter the second input element of the second attribute display to reflect a portion of the data set matching a query including the first attribute value.

Various embodiments described herein relate to a non-transitory machine-readable storage medium comprising: instructions for displaying a first attribute display representative of a first attribute of a data set, the first attribute display comprising a first input element for receiving an indication of a first attribute value; instructions for displaying a second attribute display representative of a second attribute of the data set, the second attribute display comprising a second input element for receiving an indication of a second attribute value; instructions for receiving an indication of a first attribute value for the first attribute of a data set; and instructions for after receiving the indication of the first attribute value, altering the second input element of the second attribute display to reflect a portion of the data set matching a query including the first attribute value.

Various embodiments are described wherein altering the second input element comprises removing the second input element from the second attribute display.

Various embodiments are described wherein altering the second input element comprises altering a characteristic of second input element based on the proportion of records matching the second attribute value within the portion of the data set matching the query including the first attribute value.

Various embodiments are described wherein the second attribute display includes a plurality of input elements including the second input element, wherein the plurality of input elements are associated with respective ones of a plurality of attribute values for the second attribute.

Various embodiments are described wherein altering the second input element comprises changing a dimension of the second input element relative to respective dimensions of others of the plurality of input elements based on the respective ones of the plurality of attribute values shares of the portion of the data set matching the query including the first attribute value.

Various embodiments additionally include after altering the second input element, receiving an indication of a second attribute value for a first attribute of a data set; after receiving the indication of the second attribute value, altering the first input element of the first attribute display to reflect a portion of the data set matching a query including the first attribute value and the second attribute value.

Various embodiments are described wherein the first input element includes a selection sub-element, and altering the first input element comprises changing a characteristic of the selection sub-element.

Various embodiments are described wherein altering the first input element comprises changing a dimension of a selection sub-element of the first input element based on the proportion of records matching the second attribute value within the portion of the data set matching the query including the first attribute value, and wherein the dimension of the selection sub-element is smaller than a corresponding dimension of the first input element.

Various embodiments additionally include displaying a connector element extending between the first input element and the second input element.

Various embodiments are described wherein altering the first input element comprises adjusting a dimension of the connector element associated with the first input element.

Various embodiments additionally include displaying, between the first attribute display and the second attribute display, a third attribute display representative of a third attribute of the data set, the third attribute display comprising a third input element for receiving an indication of a third attribute value.

Various embodiments are described wherein the query includes the first attribute value and at least one additional attribute value for the first attribute.

Various embodiments are described wherein the query includes the first attribute value and at least one additional attribute value for an additional attribute of the data set other than the first attribute and the second attribute.

BRIEF DESCRIPTION OF THE DRAWINGS

In order to better understand various example embodiments, reference is made to the accompanying drawings, wherein.

DETAILED DESCRIPTION

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Figure 1:
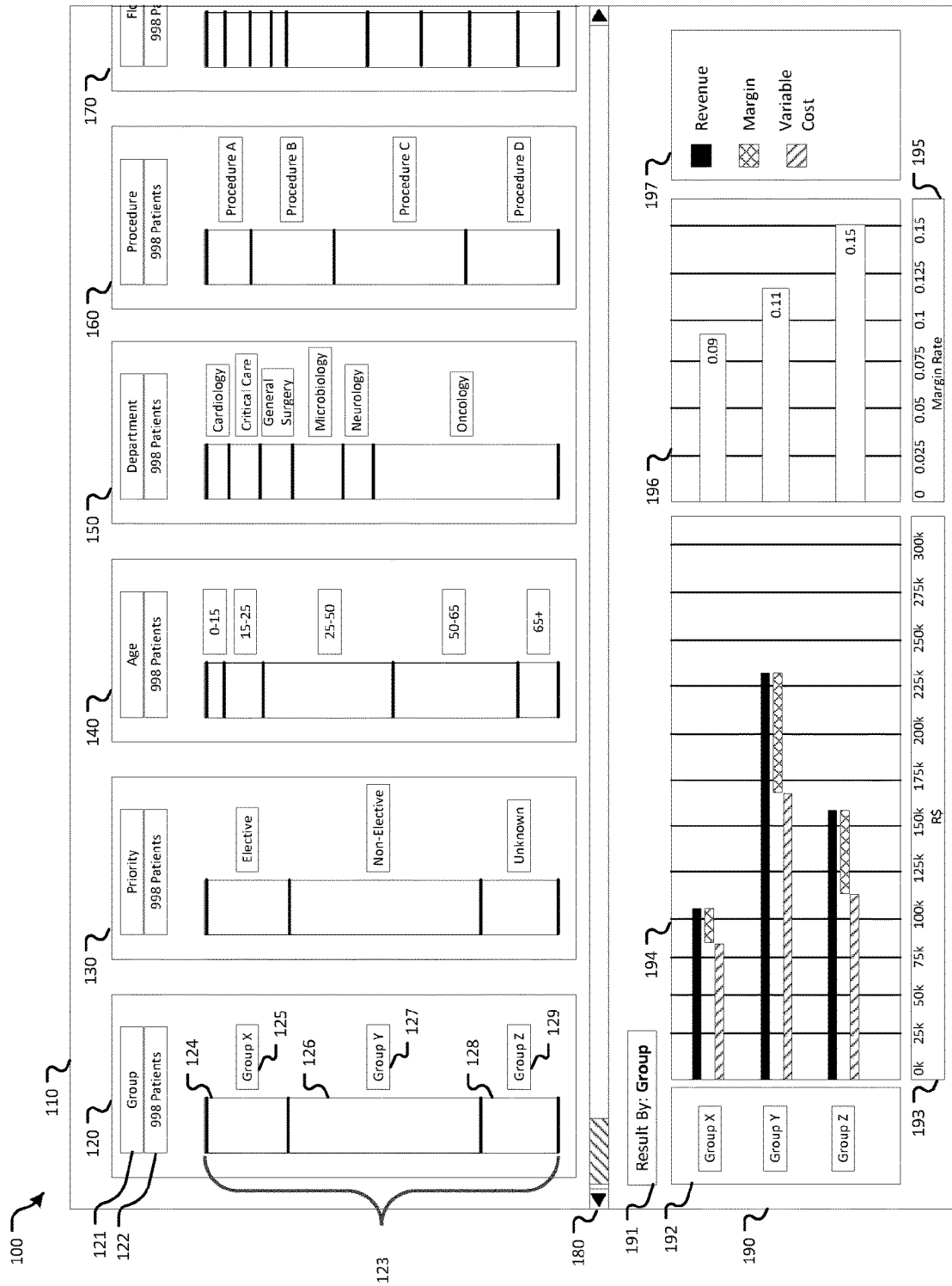
FIG. 1 illustrates an example of an interface for providing an interactive query construction interface and analytics of query results.

FIG. 1 illustrates an example of an interface 100 for providing an interactive query construction interface and analytics of query results. The interface 100 may displayed of visual display of any device such as, for example, a personal computer, laptop, tablet, smart device, etc. The interface 100 may be presented as part of a larger software suite. For example, in the illustrated embodiment the interface may be part of a hospital analytics package. It will be appreciated that the various principles described herein may be adapted to other contexts, such as software for customer or securities analytics or any software that may enable a user to explore the contents of a database or other data set.

As shown, the interface includes two panels: a query panel 110 and a results panel 190. Generally, the query panel 110 enables a user to construct a query against the underlying data set, while the results panel 190 displays the results of the currently-formed query (e.g., the retrieved records or results of analytics performed on the retrieved records. It will be apparent that while the embodiment of FIG. 1 illustrates one particular arrangement of the two panels 110, 190, the panels may be displayed in a different arrangement or with additional panels (not shown) conveying additional information. In some embodiments, the query panel 110 and results panel 190 may not be presented as separate, discrete areas but rather as a single panel that includes both types of information. In some embodiments, the query panel 110 may be displayed by itself without the results panel 190. For example, the results panel 190 may only be displayed after the user presses a button to 'submit' the query for execution or the results panel 190 may be omitted from the software package entirely (e.g., the query panel 110 may be presented as a solution in and of itself to explore the dataset according to the methods and functionality described below).

The query panel 110 includes multiple attribute displays (or attribute display elements) 120, 130, 140, 150, 160, 170 corresponding to various attributes of the underlying data set. In the illustrated embodiment, the attribute displays 120, 130, 140, 150, 160, 170 take the form of multiple blocks including labels and selectable columns, though it will be appreciated that alternative graphical forms may be used for the attribute displays 120, 130, 140, 150, 160, 170 such as, for example, groups of checkboxes with each group appearing below the last, or groups of text boxes for receiving information typed in by the user. Various modifications to implement the functionality described herein to such alternative graphical embodiments will be apparent.

As noted, the attribute displays 120, 130, 140, 150, 160, 170 correspond to respective attributes of the underlying data set. For example, as shown, items within the underlying data set may have attributes (e.g., columns within a data table) including "group," "priority," "age," "department," "procedure", and "floor." In some embodiments, the data set may include more attributes than can be displayed on the screen at one time; in such embodiments a control such as scrollbar 180 may provide a user with access to additional attribute displays not currently displayed on the screen.

Taking the first attribute display 120 as representative, an attribute display in the present embodiment includes an attribute name label 121 for indicating the attribute to which the attribute display corresponds and a record count label 122 for displaying a number of records currently available for filtering according to the current attribute (this will be explained in greater detail below). The attribute display 120 additionally includes a group of input elements 123 for selecting one or more values for the attribute to include in the query being constructed. In the present embodiments, the input elements 124, 126, 128 are regions of a column that may be clicked by the user to toggle use of the value indicated in the corresponding label 125, 127, 129 in the current query. For example, upon selecting the first input element 124, the underlying query may be modified to select only those records where the "Group" attribute equals or contains the value "Group X." Subsequently, if the user activates the last input element 128, the underlying query may be updated to select only those records where the "Group" attribute equals or contains "Group X" or "Group Z." While the input elements 128 are shown as clickable boxes (e.g., a click to toggle activation), various alternative input elements (e.g., check boxes, radio inputs, combo selectors, text boxes, etc.) may be used, potentially in combination with each other, and modifications for implementing the functionality described herein will be apparent.

The results panel 190, as shown, outputs various revenue and cost analytics performed on the data set returned by the query constructed in the query panel 110. In the illustrated view of FIG. 1, no query may yet be constructed in the query panel and, as such, the results panel 190 may display analytics performed on the entire data set. As the user builds a query via the query panel 110, the data shown in the results panel may update, e.g., in real time or after the user presses a 'submit' button. As shown, the results panel 190 includes a control 191 for altering the behavior of the results panel such as, for example, defining a parameter of a chart (the y-axis values 192 of the charts 192, 197, as shown, the x-axis values 193, 195 of the charts or the values conveyed by the bars shown as shown in the legend 197), selecting or defining the analytics to be performed, selecting whether analytics are to be performed or the records matching the query are to be displayed, or defining internal parameters of analytics to be performed such as thresholds or coefficients to use.

Figure 2:
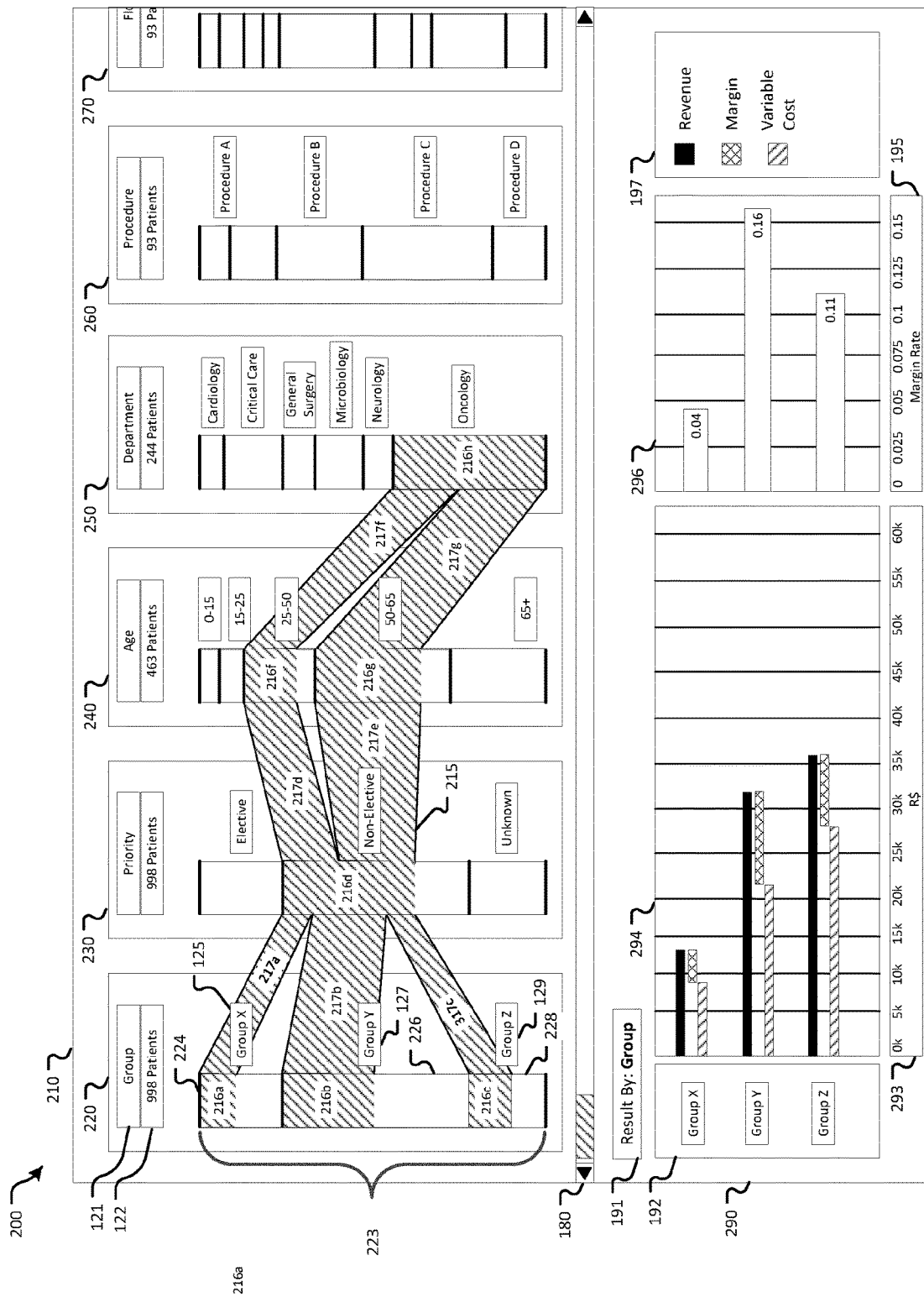
FIG. 2 illustrates another example of an interface for providing an interactive query construction interface and analytics of query results.

FIG. 2 illustrates another example of an interface 200 for providing an interactive query construction interface and analytics of query results. As shown, the interface 200 may correspond to the previous interface 100 after receiving user input and updating the display accordingly. For example, the query panel 210 shows that the user has selected seven attribute values for inclusion in the query and, as such, the current query may select records from the data set where the "Group" attribute equals or contains "Group X," "Group Y," "Group Z;" the "Priority" attribute equals or contains the value "Non-Elective;" the "Age" attribute equals or contains the value "25-50" or "50-65;" and the "Department" attribute equals or contains the value "Oncology." The results panel 290 may be similarly updated to display the results of the new query (e.g., in the displayed case, revenue and cost analytics of the retrieved subset), updating the charts 294, 296 and axis accordingly.

The query panel 210 may include one or more features that facilitate the user in interactively generating a query. For example, some such features may provide some immediate feedback as to the number and type of records being selected or the effect that selecting or deselecting a particular attribute value for inclusion in the query has on the data set being selected. In some embodiments where the attribute displays are shown in an ordered manner (in the example of this query panel 210, from left to right), the user can be given successive information about how each attribute "stage" of the query narrows the results. As shown, the data set begins with 998 patient records (as shown in the Group attribute display 220 record count label 122). The user has selected all three attribute values for the Group attribute and, as such, all 998 records are available for narrowing by the "next" attribute display 230 corresponding to the "Priority Attribute." Here, the user has selected "Non-Elective" for the "Priority" attribute, and a smaller number of records (those with "Group X," "Group Y," or "Group Z" "Group" attribute and "Non-Elective" "Priority" attribute) are passed to the "next" attribute display 240 for the "Age" attribute. This next attribute display 240 then shows that 448 records are available at that "stage" are available for further filtering. Here, the user has selected the "25-50" and "50-65" values for the "Age" attribute, and the next attribute display 250 "receives" a set of 210 patients (those with "Group X," "Group Y," or "Group Z" "Group" attribute; "Non-Elective" "Priority" attribute; and "25-50" or "50-65" "Age" attribute). Here, the user has selected one final value: the "Oncology" value for the "Department" attribute. The resulting further narrowed set of 93 records may then form the basis for the information displayed in the results panel 290. At this point, the user may select further attributes or deselect attributes to further refine the subset of records being selected.

It will be understood that while the query panel 210 may be described in terms of ordered attributes, "next" attribute displays, "staging," "delivering" of results from one attribute display to another, etc., such description may be metaphorical for the purposes of describing the operation of the query interface and may not reflect the formulation, operation, and execution of the underlying query against the data set. For example, if the attribute displays 220, 230, 240, 250 of the query panel 210 were rearranged but had the same selected attribute values, the number of patients reported in each record (as well as other feedback indicators such as input element height or selection element height as will be described below) may be altered for visualization purposes, but the query that is generated may not be changed.

Another feedback feature may be presented via a characteristic of the input elements such as, for example, a color, dimension, position, animation, etc. For example, returning to FIG. 1, the relative heights of the input elements 124, 126, 128 may be determined by the number of records within the 998 patient records that match each associated attribute value. Thus, because input element 126 is roughly half the height of the full column of input elements 123, the user may quickly gather than about half of the 998 patient records have the "Group" attribute set to or containing the value "Group Y." Likewise, viewing attribute display 160, the user may conclude that roughly one quarter of the 998 patient records have "Procedure" attributes set to a value of "Procedure D."

In some embodiments, as the user manipulates the query panel 110, 210 to alter the underlying query, these characteristics may be modified to reflect the portion of the data set being "passed in" to each successive display element. Returning to FIG. 2, it can be seen that the input elements 224, 226, 228 have the same relative heights as shown for corresponding input elements 124, 126, 128 of FIG. 1. Because in this embodiments, that attribute display 220 is the first in the order, it is still operating on the full underlying data set of 998 patient records and the breakdown of attributes within that data set has not changed. The "Procedure" attribute display, on the other hand, "receives" the results of the final query, which includes 93 patients. As such, the relative occurrence of each attribute value has likely changed. For example, the user may now conclude that of the records returned by the full current query (comprising 93 patient records), only about 1 in 10 include the value "Procedure D" for the "Procedure" attribute, where the proportion was closer to 1 in 4 before the query was entered, as shown in FIG. 1. In some embodiments, the changes in dimension (or other characteristic) may be animated to emphasize the effects of query changes on the data set. For example, rather than instantaneously setting the height of a input element to the new value, the interface may cause input elements to grow or shrink over a period of time (e.g., 500 ms, or 1 second) until they reach their new height.

In some embodiments, the relative heights are based on the attribute value occurrences occurring in the data set "delivered" by the previous input display. For example, while the first attribute display 220 may have input element heights based on the full data set of 998 records, the attribute display 240 may have input element heights based on a sub data set of 463 records, and the next attribute display may have input element heights based on a sub data set of 244 patients. Neither of these are the final query results used for the results panel 290, but rather intermediate sets reflecting the portion of the query displayed to the left of (or, otherwise, prior to in the ordering) the current attribute display.

In some embodiments, feedback may be provided to show the effect of selecting particular attributes on attributes selected earlier in the ordering. For example, a trail overlay element 215 may display connections between each of the selected elements. The trail element 215 may be divided into different portions including selection sub-elements 216*a-h* overlapping at least a portion of an input element that has been activated by a user and connector sub-elements 217*a-g* connecting adjacent selection sub-elements 216*a-g* to each other. As shown, the user may interpret all three input elements 224, 226, 228 of attribute display 220 as being selected because the trail overlay element 215 overlaps at least a portion of those input elements 224, 226, 228, thereby creating selection sub-elements 216*a-c*.

In some embodiments, a characteristic of the overlay trail element 215 may be modified to reflect changes in the underlying query or the results therefrom. For example, in some embodiments, the height of the selection sub-elements 216*a-h* may be set based on the proportion of records matching the corresponding input element's attribute value that appear in the final result set (i.e., the proportion of those records matching the selected attribute value and the entire query to all records matching the selected attribute value within the whole set of records or the intermediate set of record "passed in" by the previous attribute display in the order. For example, because the selection sub-element 216*b* is roughly half the height of the full input element 226 for the "Group Y" value, the user may conclude that half of all "Group Y" records in the full 998-record data set were captured by the entire query. Similarly, because the selection sub-element 216*f* covers about 80% of the input element corresponding to the "25-50" "Age" attribute value, the user may conclude that about 80% of the "25-50" records in the 463 records that match the "GroupX/GroupY/GroupZ" and "Non-Elective" attribute values also appear in the final query result.

As with the heights of the input elements, the heights of the selection sub-elements may also be changed as the user makes selections and the proportions of records being included in the final results changes. For example, if the user were to select the input element for "Procedure D" on the "Procedure" attribute display 260, the final results would apparently (as shown by the relative size of the "PROCEDURE D" input element) reduce in number to about 10% of the 93 records currently in the result set. This would likely (depending on the underlying data set) cause each of the selector sub-elements 216*a-h* to shrink (as well as causing the creation of a new selector sub-element and adjacent connector element for the "Procedure D" input element). In some embodiments, the changes in dimension (or other characteristic) may be animated to emphasize the effects of query changes on the data set. For example, rather than instantaneously setting the height of a selection sub-element to the new value, the interface may cause selection sub-elements and adjacent portions of connector sub-elements to grow or shrink over a period of time (e.g., 500 ms, or 1 second) until they reach their new height.

Figure 12:
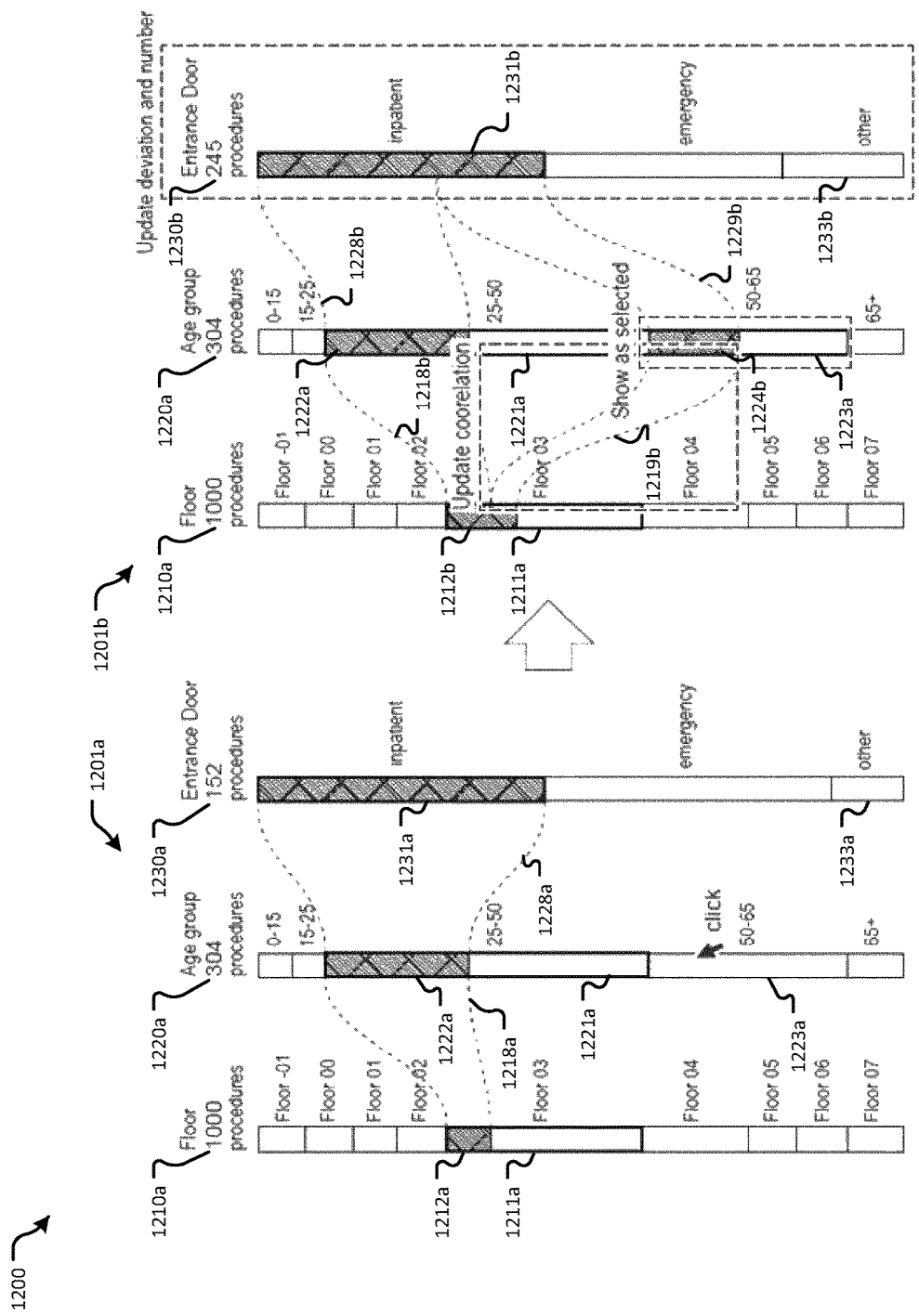
FIG. 12 illustrates an example of behavior of an interactive query interface when a user selects a new attribute value.

FIG. 12 illustrates another embodiment of a portion of a query interface 1200 implementing various feedback features. Specifically, the interface 1200 includes a single interface shown at two different times: before 1201*a* and after 1201*b* a user selects a new input element 1223*a*. Before receiving the input, the interface includes three attribute displays including respective record number labels 1210*a*, 1220*a*, 1230*a*. The first attribute display has one input element 1211*a* that has been previously selected, as indicated by the selection sub-element 1212*a* overlaying a portion of that input element 1211*a*. A connector sub-element 1218 connects the first selection sub-element 1212*a* to the only selection-sub element 1222*a* in the second attribute display. This selection sub-element 1222*a* overlays a portion of input element 1221*a*, indicating that the corresponding attribute value has been previously selected and forms part of the underlying query. Another connection sub-element 1228*a* connects the section selection sub-element to a final selection sub-element 1231*a* in the third attribute display. This selection sub-element 1231*a* completely overlays the corresponding input element, indicating that all 152 records "passed in" to the third attribute display that match the "inpatient" attribute value for the "Entrance Door" attribute (this would make sense, as the third attribute display is the final one in the UI order that has selected attribute values; there are no subsequent query portions to further limit the results and reduce the proportion of the input element covered by the selection sub-element 1231*a*).

Upon the user clicking an additional input element 1223*a*, the interface 1201*a* changes (e.g., instantly, or over a short period of time) to the later version of the interface 1201*b*. As shown, the input element 1223*a* is now overlaid by a new selection sub-element 1224*b*, indicating that the input element 1223*a* has been selected. The selection sub-element

1224*b* only covers a portion of the 304 incoming records that are also associated with the "50-65" attribute value because the third attribute display still remains downstream to further limit the query based on the attribute values selected therein. The input element 1223*a* height, however has not changed because the same 304 records are still being "passed in" by the first attribute display and, therefore, the distribution of attribute values among these 304 records has not changed. Conversely, the third attribute display now shows that additional records are being "passed in:" label 1230*b* now shows 245 records rather than the 152 records shown before the user input by label 1230*a*. This follows from the fact that, now, records that have either the "25-50" or the "50-65" attribute value for the "age group" attribute are being passed in, instead of only "25-50" "Age group" records being passed in previously. The change in number of records also means that the distribution of "Entrance Door" attribute values has likely (depending n the data set) changed. For example, as shown, the input element 1233*b* is now taller than the previous version of that input element 1233*a*. This may imply that records with the "other" "Entrance door" attribute value make up a larger proportion of the records "passed in" to the third attribute display when the "50-65" "Age group" records are added in. The "inpatient" input element 1231*b*, however, has not changed, indicating that the proportion of these records is roughly the same with or without the "50-65" age group.

Upon adding the new selection sub-element 1224*b*, new connector elements are added: one connector sub-element 1229*b* to the downstream selection sub-element 1231*b* and another connector sub-element 1219*b* to the upstream selection sub-element 1212*b*. That upstream selection sub-element 1212*b* has also grown in height, indicating that a larger proportion of those records having the "Floor 3" "Floor" attribute value have made it into the final result set (because the "50-65" records have been added back in). The height of the corresponding input element 1211*a* has not changed, because the downstream attribute selection has no effect on the 1000 records "coming in" to the first attribute display, and therefore the attribute value distribution has not changed.

Figure 13:
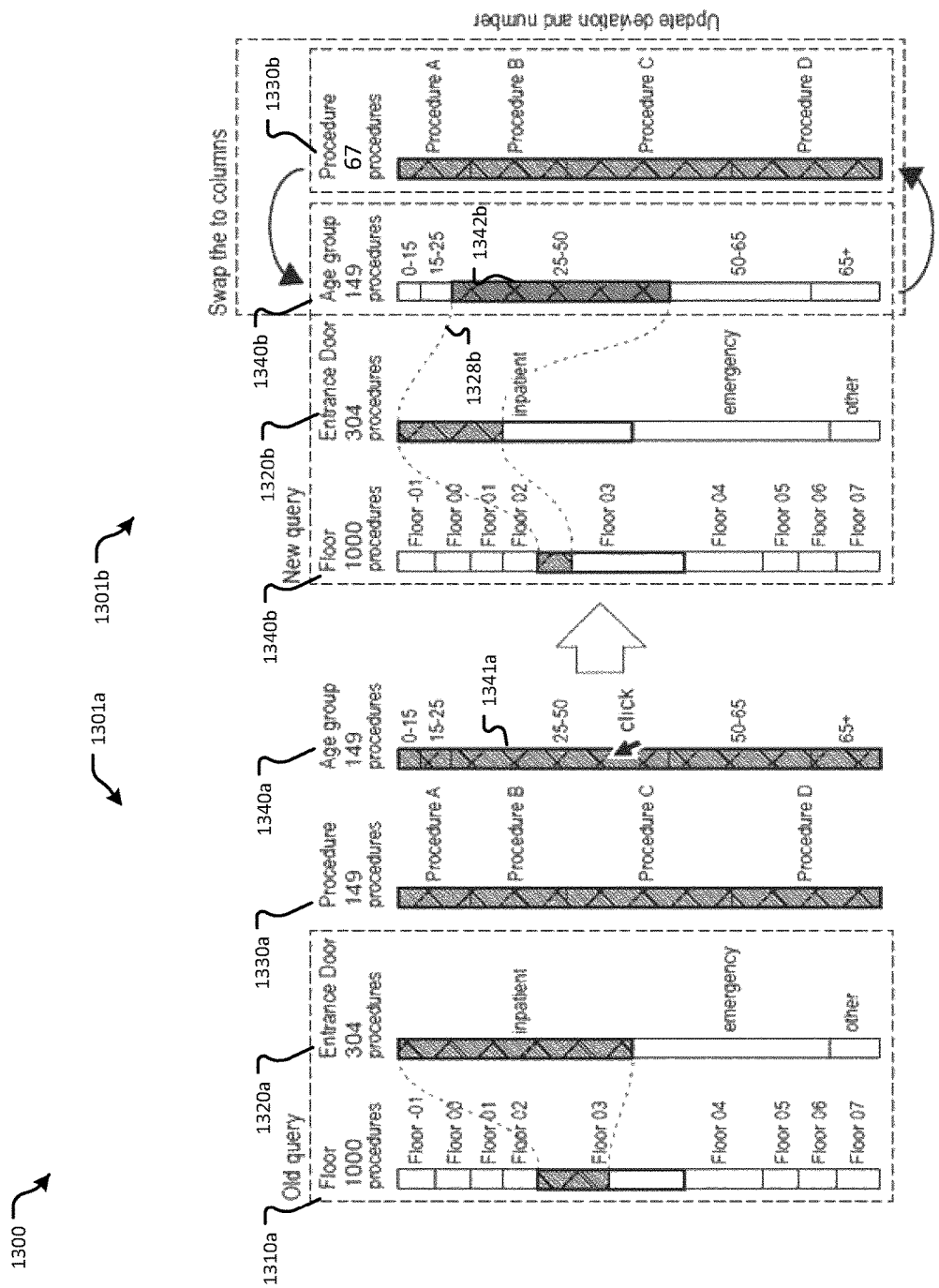
FIG. 13 illustrates another example of behavior of an interactive query interface when a user selects a new attribute value.

In some embodiments, the attribute displays may be reordered, automatically or manually. For example, FIG. 13 illustrates another embodiment of a query interface. Specifically, the interface 1300 includes a single interface shown at two different times: before 1301*a* and after 1301*b* a user selects a new input element 1341*a* to modify the current query. The first interface 1301 includes four attribute displays 1310*a*, 1320*a*, 1330*a*, 1340*a*, of which two 1310*a*, 1320*a* have currently selected attribute values and therefore form part of the current query. Upon clicking the input element 1341*a* in the fourth attribute display 1340*a*, the fourth attribute display 1340*a* and third attribute display 1330*a* swap positions. This swap places the original fourth attribute display 1340*b* adjacent the second attribute display 1320*b* (i.e., the previous final attribute display participating in the current query. This position change enables a new connector sub-element 1328*b* to be drawn from the second attribute display 1320*b* and the new selection sub-element 1342*b* drawn in the fourth attribute display 1340*b*. It will be apparent that the newly selected attribute display 1340*b* need not "jump" only a single slot, as is illustrated. Instead, in the first interface 1301*a*, one or more additional attribute displays (not shown) may be positioned between the second attribute display 1320*a* and third attribute display 1330*a*. The third attribute display 1330*b* then either shifts downward one slot, displacing any subsequent attribute displays (not shown) by one slot as well, or takes the fourth attribute's previous position without displacing any other attribute displays (not shown). The record totals, input elements, selection sub-elements, and connector sub-elements may also be updated as appropriate and as described above with respect to FIGS. 1, 2, and 12.

Figure 14:
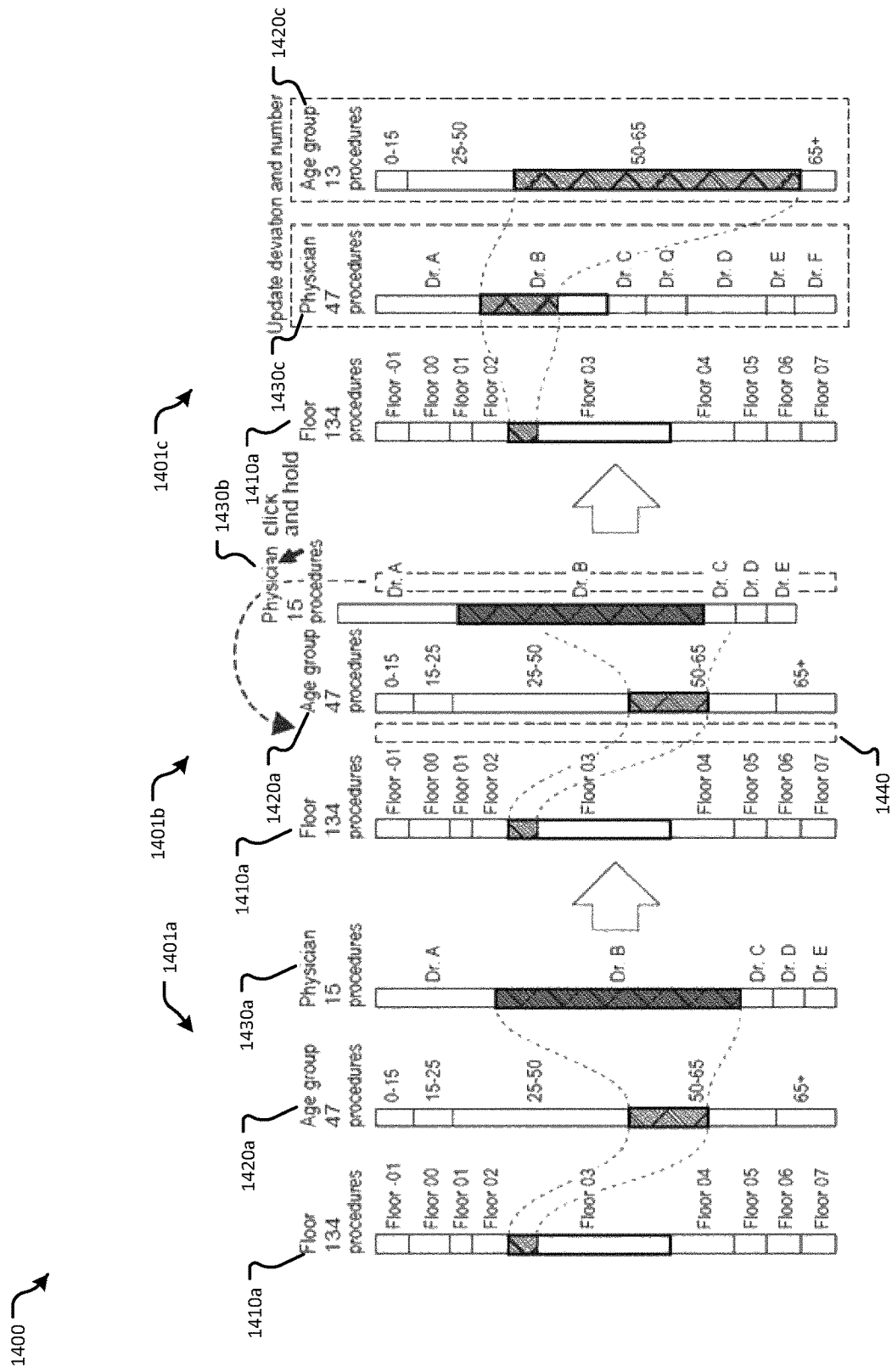
FIG. 14 illustrates an example of behavior of an interactive query interface when a user moves a column.

In some embodiments, the user may be able to manually rearrange the columns, for example, to have an alternate view of how the current query narrows down the data set at an alternate ordering of stages. FIG. 14 illustrates another embodiment of a query interface 1400 including view of the interface at three different points in time: an interface before the user begins a move operation 1401*a*, an interface during a move operation 1401*b*, and an interface after the move operation is complete 1401*c*. As shown, the interface 1401*a* initially includes three attribute displays 1410*a*, 1420*a*, 1430*a*. The user decides that they would like to visualize this query in the order of first attribute display 1410*a*, third attribute display 1430*a*, and second attribute display 1420*a*. The user clicks a portion of the third attribute display 1430 (e.g., the header block) and drags it to the space between the first and second attribute displays, 1410*a*, 1420*a*. As shown, the third attribute display (or a portion of it) may move with the cursor and an indicator 1440 of where the attribute display will "land" if let go may be displayed. When the user lets go of the third attribute display 1430*c*, it will be placed in its new location (e.g., as previously indicated by the indicator 1440), and the interface will be updated in a manner similar to that explained above with respect to FIG. 13. For example, the second attribute display 1420*c* may shift down a slot or swap places with the third attribute display 1430*c*, other attribute displays (not shown) may shift downward, or the input elements, selection sub-elements, or connector sub-elements may be redisplayed with new characteristics (e.g., heights).

Figure 3:
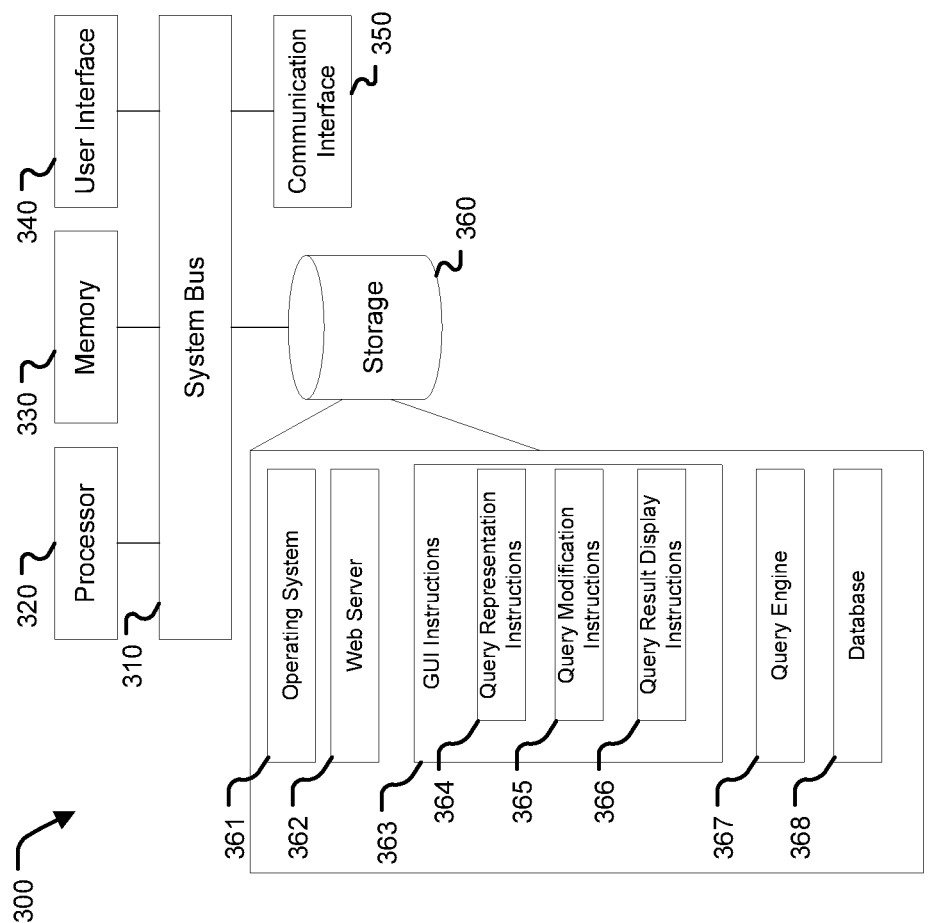
FIG. 3 illustrates an example of a hardware device for providing an interactive query and analytics interface.

FIG. 3 illustrates an example of a hardware device 300 for providing an interactive query and analytics interface. As shown, the device 300 includes a processor 320, memory 330, user interface 340, communication interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, field programmable gate array (FPGA), application-specific integrated circuit (ASIC), or other similar devices.

The memory 330 may include various memories such as, for example L1, L2, or L3 cache or system memory. As such, the memory 330 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 340 may include one or more devices for enabling communication with a user such as an administrator. For example, the user interface 340 may include a display, a mouse, and a keyboard for receiving user commands. In some embodiments, the user interface 340 may include a command line interface or graphical user interface that may be presented to a remote terminal via the communication interface 350.

The communication interface 350 may include one or more devices for enabling communication with other hardware devices. For example, the communication interface 350 may include a network interface card (NIC) configured to communicate according to the Ethernet protocol. Additionally, the communication interface 350 may implement a TCP/IP stack for communication according to the TCP/IP protocols. Various alternative or additional hardware or configurations for the communication interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. In some embodiments, such as those wherein the interface 100, 200 is presented via a web-based application, the storage 360 may include a web server 362 for communicating with a remote terminal. The storage 360 may also include graphical user interface (GUI) instructions 363 for displaying and receiving input via an interface, such as those illustrated in FIGS. 1 and 2. The GUI instructions 363 may include instructions for performing various functionalities described herein such as, for example, query representation instructions 364 for displaying a visual representation of a current query (e.g., such as query panel 110, 210); query modification instructions 365 for receiving input via the query representation and modifying an underlying query for submission to the database 368 via a query engine 367 accordingly; and query result display instructions 366 for displaying the result of a query such as retrieved records or analytics performed therein (e.g., such as result panel 190, 290). The query engine 367 may be any engine for querying a database such as, for example, an SQL query engine, while the database may be an database (or other data set) than can be queried. In various embodiments, the query engine 367 or database 368 may not be stored locally to the GUI instructions 363 and, instead, queries may be submitted to a remote device via the communication interface 350.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the hardware device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

Figure 4:
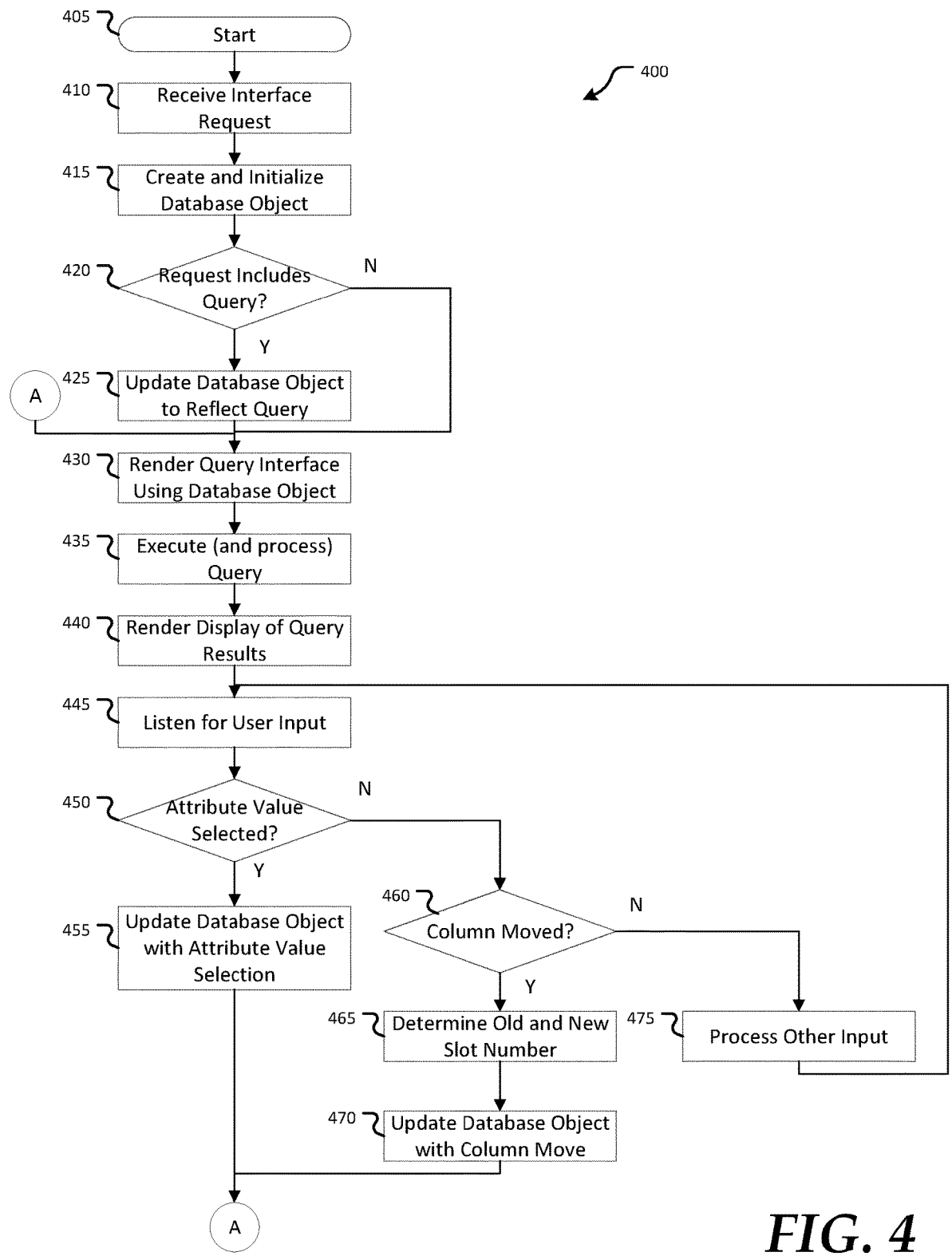
FIG. 4 illustrates an example of a method for providing an interactive query and analytics interface and corresponding functionality.

FIG. 4 illustrates an example of a method 400 for providing an interactive query and analytics interface and corresponding functionality. The method 400 may correspond, for example, the GUI instructions 363 of FIG. 3. The method 400 may be, in some respects, an abstraction and a general description of the operations performed by the device for providing an interactive query interface; various additional details regarding example implementations of some steps of the method 400 will be described in greater detail below with respect to FIGS. 5-11.

The method 400 begins in step 405 and proceeds to step 410 where the device receives a request for the query interface. For example, the device may receive a web request for a URL configured within the web server to point to the query interface or a software suite incorporating the interface may cause the processor to access the interface instructions. In step 415, the device may create and initialize a database object for representing relevant information about the database for use in rendering the query interface and interpreting input therefrom. For example, the database object may include metadata such as, for example, attributes and their potential values within the database, number of records within the database, the current query, number of records matching the current query or portions thereof, etc. It will be appreciated that while various examples described herein relate to exploring a database, the methods herein may be adapted to other data sets that are not organized as true database.

In some embodiments, the request received in step 410 may also indicate an initial query. For example, a portion of the URL, an API request, or the instructions from the requesting software suite may specify a query on the database. The method 400 determines in step 420 whether such a query has been provided and, if so, updates the database object to reflect the incoming query in step 425. Otherwise, the database object is left in its initialized state of not including any current query (or a current query that selects all records in the database).

In step 430, the device renders the query interface from the database object. For example, the device may render an interface such as query panels 110, 210. In step 435, the device executes the current query (and performs any analytics that are to be performed on the result) and, in step 440, renders those results for display to the user (e.g., as a results panel such as results panels 190, 290). Various methods for executing queries, performing analytics on results sets, and displaying the results will be apparent.

In step 445, the device waits until the user provides input. For example, the user may provide input via the query interface such as selecting an input element or rearranging the attribute displays. The device then begins interpreting the input by, in step 450, determining whether the input includes the selection of an attribute value. If so, the device updates the database object to reflect the attribute value selection (e.g. to add or remove the attribute value from the query). The method 400 then loops back to step 430 to re-render the query interface based on the updated query.

If the input is not an attribute value selection, the method 400 proceeds to step 460 where the device determines whether the input has moved an attribute display to a new position in the query interface. If so, the device determines where the attribute display has been moved from and to (e.g., a slot number defined within the interface) and updates the database object in step 470. The method 400 then loops back to step 430 to re-render the query interface based on the updated query interface ordering.

If the input has not moved an attribute display, the device proceeds to process other input (e.g., changes to the results display) and loop back to step 445 to listen for further input. Various additional functionality for implementation within the query interface and results displays described herein will be apparent. The method 400 continues operating in this manner, in some embodiments, until the user decides to navigate away from or otherwise close the query interface.

Figure 5:
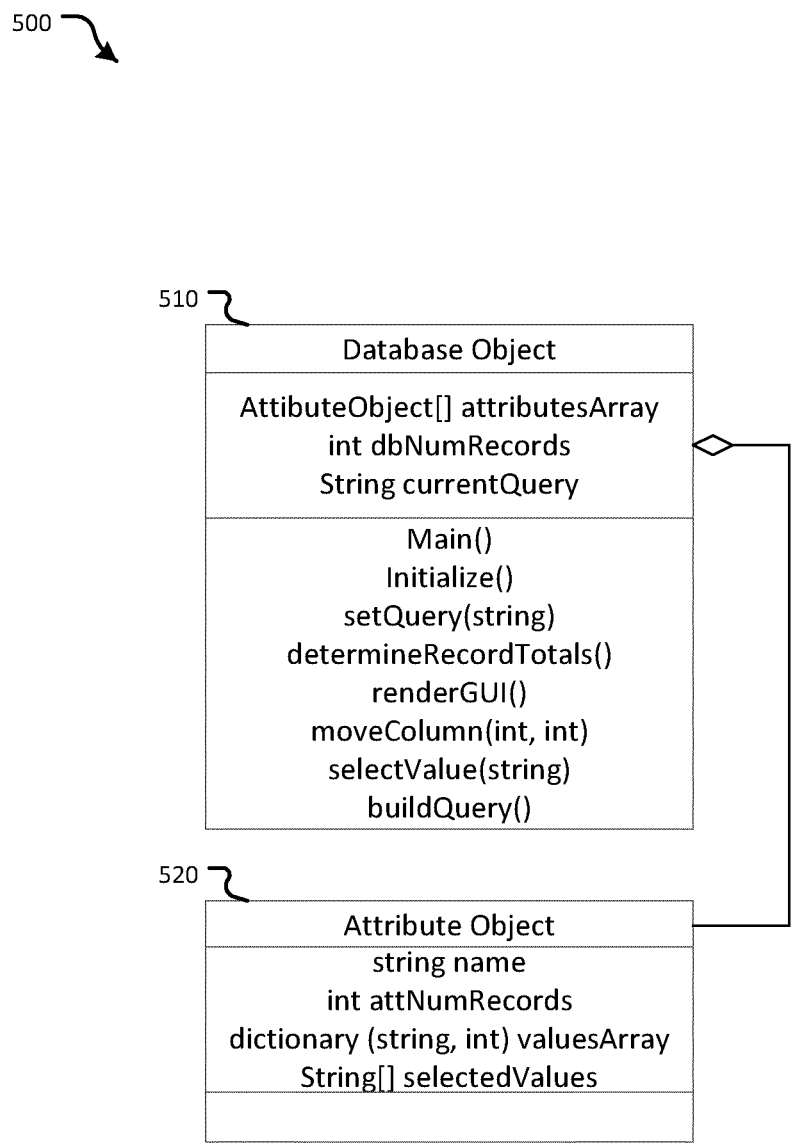
FIG. 5 illustrates an example of data structures for use in providing the interactive query functionality described herein.

FIG. 5 illustrates an example of data structures 500 for use in providing the interactive query functionality described herein. As will be understood, various alternative data structures may be used to support the example methods described herein or other methods for implementing the functionality described herein. In various embodiments, the data structures 500 may belong to the GUI instructions 363 of FIG. 3 and may implement, for example part or all of the query representation instructions 364, query modification instructions 365, or query result display instructions 366.

As shown, the Database Object class 510 includes an array of Attribute Objects (explained in further detail below) for storing an indication of each attribute used in the database. The database object also includes a count of the total number of records in the database as well as a string storing the current query input by the user via a query interface. The Database Object 510 may also include multiple methods including a Main( ) method that may correspond to the method 400 of FIG. 4. Other methods may include an Initialize( ) method for initializing the Database Object 510 to reflect the structure of the underlying database; a setQuery(string) method for configuring the initialized database object to reflect an already formed query (e.g., as may be passed in for initial display); a determineRecordTotals( ) method for determining the record totals to display for each attribute display; a renderGUI( ) method for rending the GUI based on the information stored in the Database Object 510; a moveColumn(int, int) method for moving an attribute display from one slot to another; a selectValue (string) method for handling a user attribute value selection (or deselection); and a buildQuery( ) method for generating a string query from the current state of the Database Object 510 suitable for submission to a query engine.

The Attribute Object class 520 may be used represent an individual attribute within a database. The Attribute Object 520 may include a name of the attribute; a number of records currently "passed in" to the Attribute Object 520 at its current position in the array of the Database Object 510; a dictionary or other suitable data structure for storing the potential values for the attribute as well as a number of records matching that value, of those "passed in" to the attribute; and an array of strings recording the currently selectedValues (if any).

Figure 6:
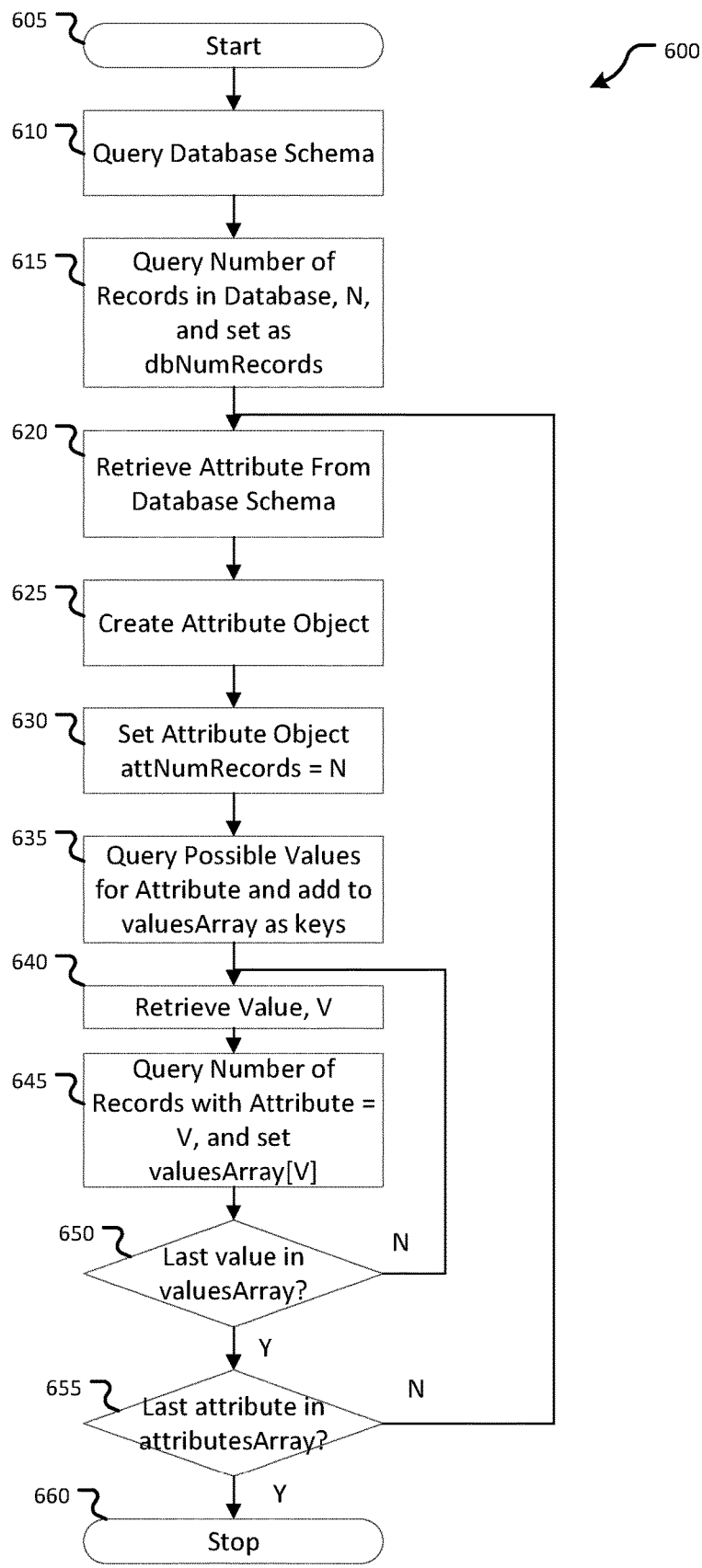
FIG. 6 illustrates an example of a method for creating and initializing a data structures for use in providing the interactive query functionality described herein.

FIG. 6 illustrates an example of a method 600 for creating and initializing a data structures for use in providing the interactive query functionality described herein. The method 600 may correspond, for example, to step 415 of method 400 or the Initialize( ) method of the database object 510. The method begins in step 605 and proceeds to step 610 where the device queries the database schema to retrieve the list of attributes. In step 615, the device queries the total number of records in the database and sets the dbNumRecords variable to this value.

The method 600 then begins to loop through the attributes by, in step 620, retrieving a first attribute to address and, in step 625, creating an attribute object to represent the attribute. In various embodiments, the method 600 may assume that no query is set (another method may enable the initial setting of a query in the database object 510) and, as such, set the attNumRecords value to the total number of records in the database (i.e., with no attribute values yet selected, each attribute "receives" all records in the database for potential filtering).

In step 635, the device queries the database for all possible values for the current attribute. In some embodiments, this step may involve one or more queries to the database or reading a configuration previously provided by a system administrator. For example, if each record includes a patient age, the configuration file may specify groups of ages that should be treated as a single value (e.g., "25-50" would catch records associated with 25 year olds and 40 year olds alike). Once the potential values are identified, they are added to the valuesArray for the current attribute as keys. The method 600 then begins to loop through the possible values by, in step 640, retrieving a first value, V, to process. In step 645, the device queries the database for the number of records with the current value V for the current Attribute. The device records this number as the data to which the current value, V, points as a key in the valuesArray for the current attribute. The method 600 then determines, in step 650 whether additional values remain to be processed for the attribute. If the current value is not the last, the method 600 loops back to step 640 to process the next value. Otherwise, method 600 determines, in step 655 whether additional attributes remain to be processed for the database. If the current attribute is not the last, the method 600 loops back to step 620 to process the next attribute. Otherwise, the method 600 proceeds to end in step 660.

Figure 7:
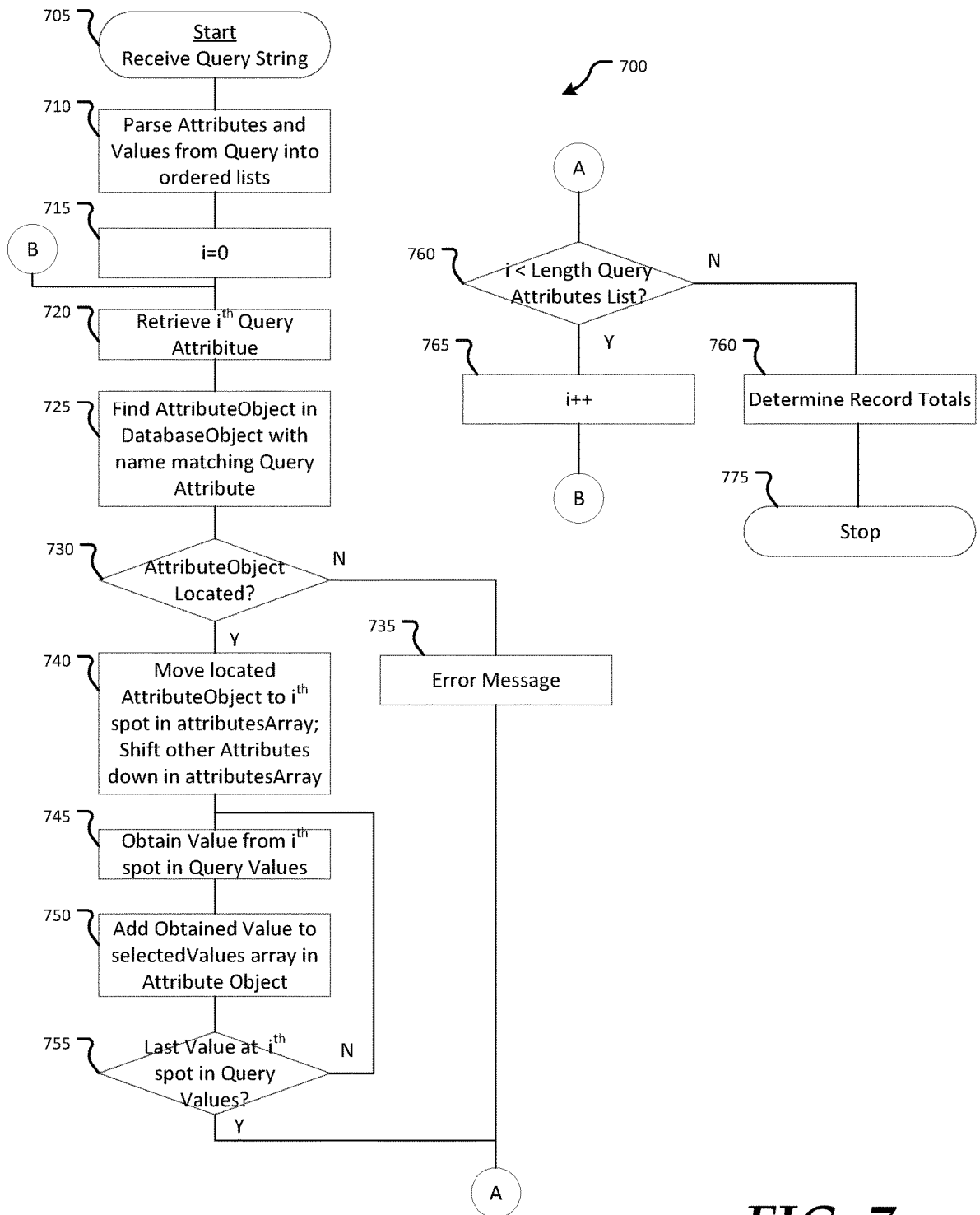
FIG. 7 illustrates an example of a method for updating a data structure to reflect a query.

FIG. 7 illustrates an example of a method 700 for updating a data structure to reflect a query. The method 700 may correspond to step 425 of method 400 or the setQuery (string) method of the Database Object 510. The method begins in step 705 where the query string is received and proceeds to step 710, where the device parses attributes and their associated values from the query into ordered lists. Various tokenizers and other approaches to parsing a query into its components will be apparent. For example, if the query received is "SELECT*FROM database WHERE (Group='Group X') AND (Priority='Non-Elective' OR Priority='Unknown');", the device may parse this query into a list of two attributes and a list of two groups of values: {Group; Priority} and {(Group X); (Non-Elective, Unknown)}.

After identifying the attributes and values in the received query, the method 700 begins to iterate through each of the identified attributes by first initializing an index, i, to 0 in step 715. In step 720, the device retrieves the attribute at the $i^{th}$ spot of the attributes list identified in step 710 and then, in step 725, the device locates the AttributeObject within the attributeArray of the Database Object that matches the current attribute. In step 730, the device determines whether the Attribute Object was successfully located; if not, the device logs or outputs an error message in step 735 and proceeds to step 760 thereby skipping further processing of the current attribute (since it is unknown to the Database Object). If, on the other hand, the device is able to locate a matching Attribute Object in the attributeArray, the method proceeds to step 740 where the device moves that attribute object to the $i^{th}$ position in the attributesArray, making room by shifting each existing element down the array one spot (or swapping positions or any other approach effective to move the Attribute Object to the desired spot). Thus, the order of the portion of the attributesArray contributing to the current query will initially match the order in which the attributes appear in the query string. Alternative ordering approaches will be apparent.

The method 700 then begins iterating through the query values for the current attribute by, in step 745 retrieving a value from the $i^{th}$ spot in the Query Values list and, in step 750, adds that attribute value to the selectedValues array of the current Attribute Object. In step 755, the device determines whether additional values remain to be processed within the $i^{th}$ spot of the Query Values list; if the current value is not the last in the $i^{th}$ spot, then the method loops back to step 745 to process the next value. Otherwise, the method proceeds to step 760.

In step 760, the device determines whether additional attributed remain in the Attributes List from step 710 for processing by, for example, determining whether i remains less than the length of the Query Attributes List. If so, the device increments i in step 765 and loops back to step 720 to process the next attribute. After all attributes in the Attribute List have been processed, the method 700 proceeds to step 760 where the device determines the record totals being "passed in" to each Attribute Object in the array. An example method for determining such record totals will be described in greater detail below with respect to FIG. 8. The method 700 then proceeds to end in step 775.

Figure 8:
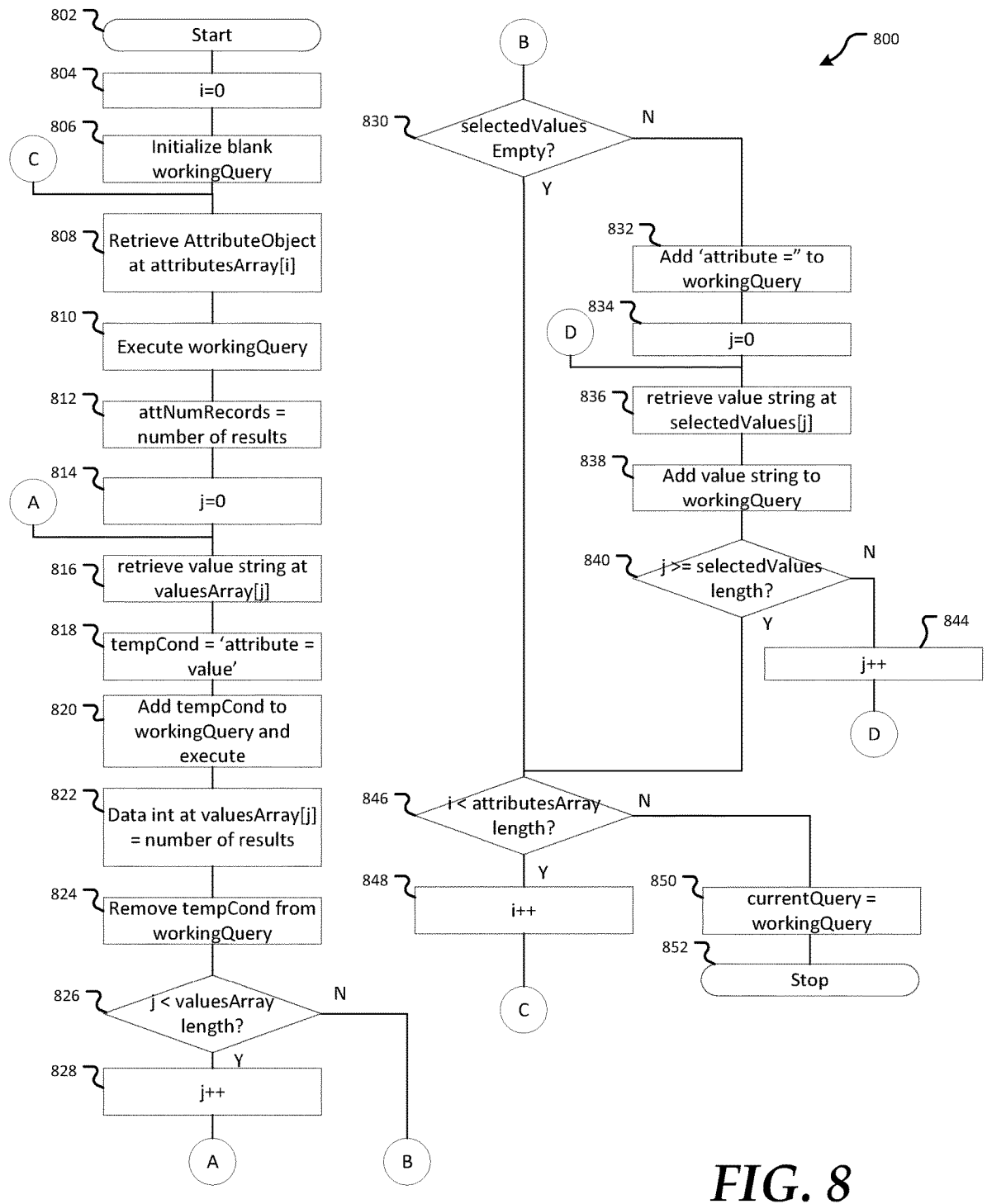
FIG. 8 illustrates an example of a method for determining record totals for potential attribute value options.

FIG. 8 illustrates an example of a method 800 for determining record totals for potential attribute value options. The method 800 may correspond to step 760 of method 700 or the determineRecordTotals( ) method of the Database Object 510. The method 800 begins in step 802 and proceeds to step 804 where the device initializes an index variable, i, to zero. The device also initializes a blank workingQuery in step 806 (e.g., a blank string or a template query such as "SELECT*FROM database WHERE" or "SELECT COUNT(id) FROM database WHERE."

The device, in step 808, retrieves an Attribute Object to process from the $i^{th}$ spot of the attributesArray and, in step 810, executes the workingQuery. On the first iteration, where nothing has been added to the workingQuery, execution of the working query may return all records in the database (or a count thereof). In step 812, the device records the number of results for the current workingQuery as attNumRecords for the current Attribute Object to represent the number of records being "passed in" to the Attribute Object.

Next, the method begins to record the results for each possible value of the attribute object by, in step 814, initializing another index variable, j, to 0 and, in step 816, retrieving the value string at the $j^{th}$ spot in the valuesArray for the current Attribute Object (e.g. the ithkey where the valuesArray is a dictionary). In step 818, the device creates a temporary query condition, tempCond, for matching the current attribute to the current value. The device adds tempCond to the appropriate part of the workingQuery and executes it to determine the number of matching records. The device records the number of records as the data to which the current key points in the valuesArray in step 822, and removes tempCond from the workingQuery in step 824 to restore it to the workingQuery to its previous form before execution of step 820. The device then determines, in step 826, whether additional values remain to be processed by, for example, determining whether j is less than the length of the valuesArray. If the values remain to be processed for the current Attribute Object, the device increments j in step 828 and the method 800 loops back to step 816 to process the next value in valuesArray. Once all values for the current Attribute Object have been processed and record numbers recorded therefor, the method 800 proceeds to step 830.

In step 830, the device determines whether at least one value has been selected for the current Attribute Object. If not, the method 800 skips ahead to step 846. If, on the other hand, the selectedValues array is not empty, the method proceeds to step 832 where the device adds the current attribute to the workingQuery. Then, the device begins to iterate through the selected values by first initializing the index, j, to 0 in step 834 and then retrieving the $j^{th}$ value from the selectedValues array in step 836. In step 838, the device adds the current value to the workingQuery. The device then determines if additional selectedValues remain for processing in step 840 and, if so, increments j in step 844 and loops back to step 836 to process the next selected value. After all selected values are added to the workingQuery, the method 800 proceeds to step 846.

Having fully processed the current Attribute Object (e.g., by recording the attribute value incoming records, recording the record numbers for each attribute value, and adding the current attribute and selected values to the workingQuery for use in the next iteration), the device determines in step 846 whether additional Attribute Objects remain to be processed within the attributesArray. If additional Attribute Objects remain, the device increments i in step 848 and loops back to step 808 to begin processing the next Attribute Object. Once all Attribute Objects have been processed, the device sets the currentQuery equal to the final version of the workingQuery (incorporating all selected attribute values encountered after iterating through all Attribute Objects) in step 850 and the method proceeds to end in step 852.

Figure 9:
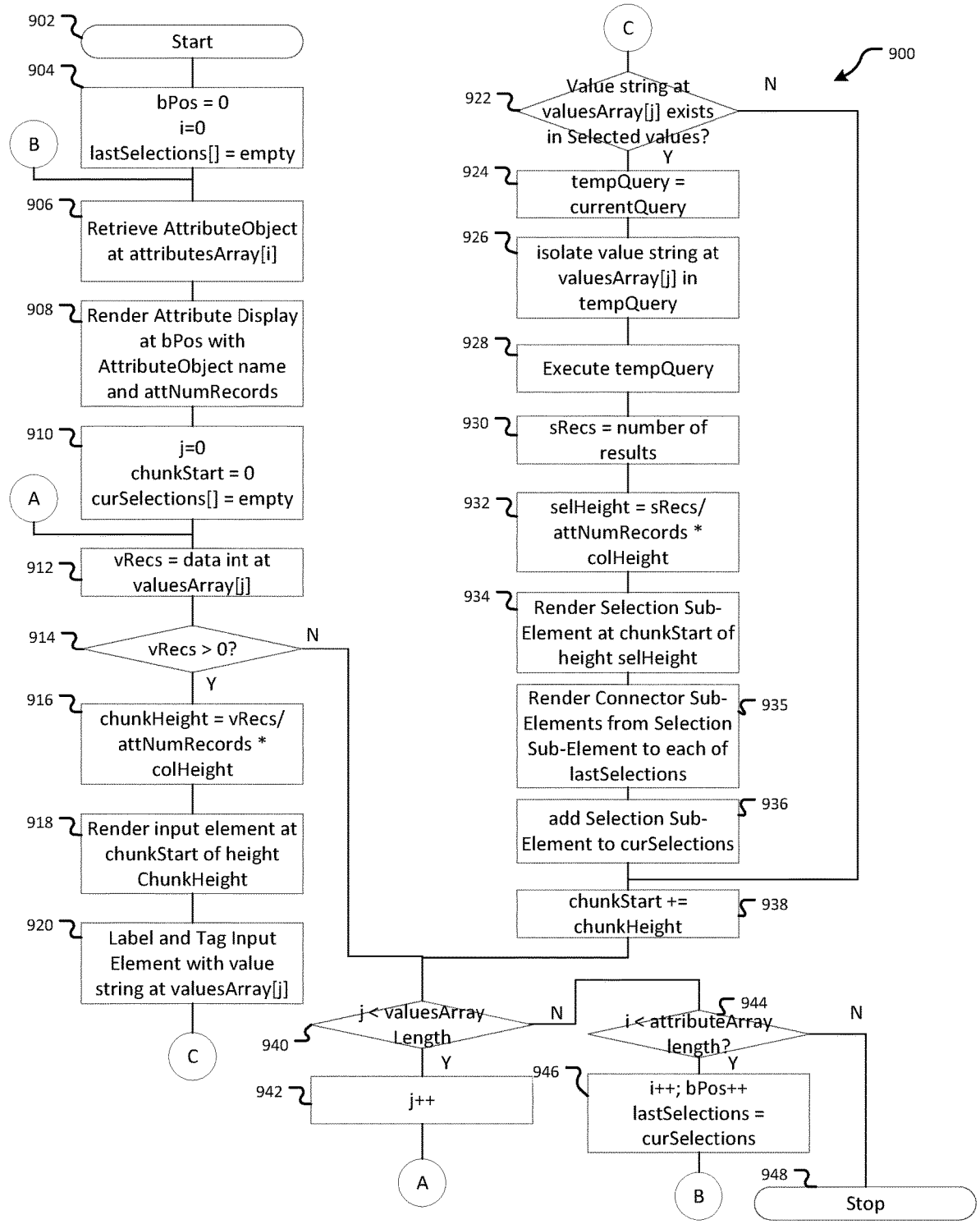
FIG. 9 illustrates an example of a method for rendering an interactive query interface.

FIG. 9 illustrates an example of a method 900 for rendering an interactive query interface. In various embodiments, the method 900 may correspond to step 430 of method 400 or the renderGUI( ) method of the Database Object 510. The method begins in step 902 and proceeds to step 904 where the device initializes three variables: bPos for tracking block position, i for tracking an index, and the lastSelections array for tracking the selected blocks in the previously-processed block for use in drawing connector sub-elements. In step 906, the device retrieves the it Attribute Object from the attributesArray and, in step 908, renders an Attribute Display (e.g., an Attribute Display as is described above with reference to FIGS. 1-2) at the block position associated with the current bPos. As previously described, the Attribute Objects are inserted into the attributeArray in the intended order and, as such, the Attribute Objects may be displayed in the order they appear in the attributesArray without further sorting.

The device then begins to render the input elements for the current attribute display by first, in step 910, initializing another index, j, a chunkStart variable, and a current selections array. In step 912, the device retrieves the data from the valuesArray at the $j^{th}$ spot (e.g., the number of records associated with the $j^{th}$ attribute value). As previously described, the number of records matching each attribute value within the "incoming" set of records was previously calculated as part of another method and, as such, no further calculation or query may be performed to determine the number of records for the current attribute value, vRecs. In step 914, the device determines whether the current value is associated with any records. If not, the method 900 skips ahead to step 940. Otherwise, if there is at least one record noted for the current attribute value, the method 900 proceeds to step 916 where the device determines the appropriate height for the input element to be rendered, chunkHeight. As noted previously, the chunkHeight may be set based on the proportion of records matching the attribute value within the set of records being "passed in" to the current attribute. For example, the device may set the chunkHeight to equal vRecs divided by the total number of records for the current attribute, attNumRecords, times the total desired height for the column of input elements. In step 918, the device renders the input element starting at position chunkStart of height chunkHeight. The input element may be rendered not only with the appropriate visual indicator, but also interactivity functionality to receive user selections. In step 920, the device labels and tags the new input element with the name of the attribute value, as stored as a key in the valuesArray at the $j^{th}$ position. By tagging the input element, the attribute value may be carried by any message generated by a user selection of the input element.

In step 922, the device determines whether the current attribute value is also a selected value (e.g., is also stored in the selectedValues array) and therefore needs to be rendered with a selection sub-element. If not, the method 900 skips ahead to step 938. Otherwise, if the current attribute value is a selected value for the query, the method proceeds to step 924, where the device creates a tempQuery that is initially equal to the current query. In step 926, the device isolates the current attribute value within the tempQuery for that attribute. For example, if the attribute value is the only value selected for the current attribute, the device may not modify the tempQuery. If there is more than one attribute value selected for the current attribute, the device may eliminate all values for the current attribute except for the current attribute (leaving other attributes within the query untouched). The device executes the tempQuery in step 928 and then records the number of results as sRecs in step 930. The device then determines the height of the selection as the proportion of records matching the current attribute value within the final result set to the total number of records passed in to the current stage. For example, the device may calculate selHeight as sRecs divided by the total number of records for the current attribute, attNumRecords, times the total desired height for the column of input elements. In step 934, the device renders the selection sub-element at chunkstart and of height selHeight (thus at least partially overlapping the input element rendered in step 918). In step 935, the device renders connector sub-elements between the current selection sub-element and any selection sub-elements from the previously-rendered Attribute Display as recorded in the lastSelections variable. In step 936, the selection sub-element is added to curSelections to keep track of those selection sub-elements rendered for the current Attribute Display.

In step 938, the device adds the chunkHeight to the chunkStart variable, such that the next input element or selection sub-element may be rendered starting at the position where the previous input element ends. In step 940 the device determines whether additional values remain to be processed for the current Attribute. If so, the device increments the index j in step 942 and the method 900 loops back to step 912 to process the next attribute value for the current attribute. Once all possible attribute values for the current attribute have been processed, the method 900 proceeds to step 944 where the device determines whether additional attributes remain to be processed. If so, the device increment and bpos, and transfers curSelections to lastSelections, such that the current selection sub-elements may be used for creating any needed connector sub-elements when rendering the next Attribute Display. The method 900 then loops back to step 906 to process the next attribute. Once all attributes have been processed, the GUI has been fully rendered and the method 900 may end in step 948.

Figure 10:
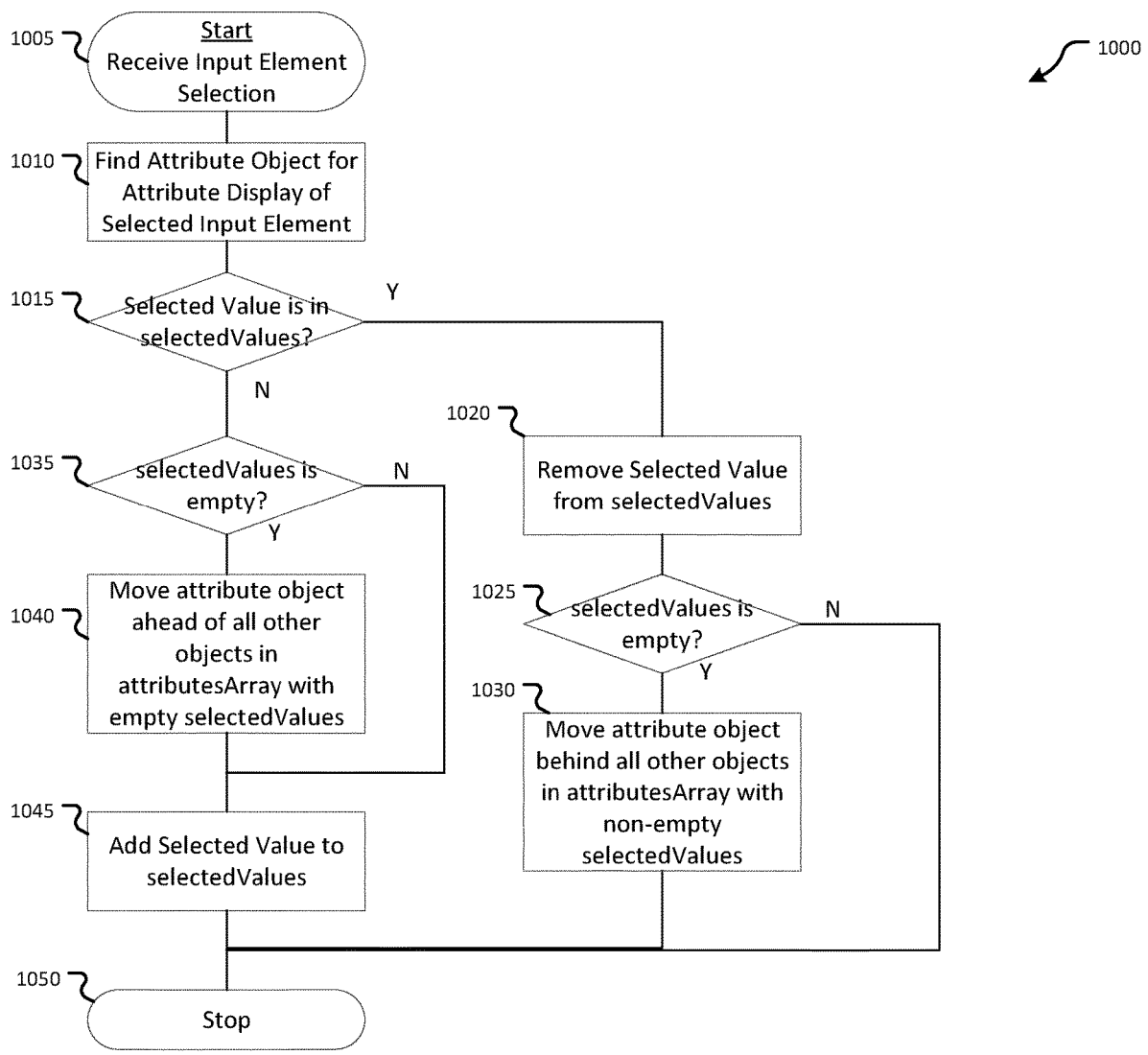
FIG. 10 illustrates an example of a method for updating a database object with a new attribute value selection.

FIG. 10 illustrates an example of a method 1000 for updating a database object with a new attribute value selection. In various embodiments, the method 1000 may correspond to step 455 of method 400 or the selectValue (string) method of the Database Object 510. The method 1000 begins in step 1005 where the device receives, from the user, a selection of an input element. In step 1010, the device locates the Attribute Object within the attributesArray to which the selected input element corresponds. Next, the device determines whether the current operation is a selection or deselection by determining whether the attribute value associated with the input element is already stored in the selectedValues array for the Attribute Object. If the value is already in selectedValues, then the input selection is to be treated as removing an existing selection from the query and the method 1000 proceeds to step 1020.

In step 1020 the device removes the current value from the selectedValues array. In step 1025, the device determines whether selectedValues is now empty and, consequently, whether the Attribute Display should be moved to a position occurring after the Attribute Displays forming the current query. If so, the device moves the attribute object to a spot in the attributesArray where no subsequent Attribute Objects include non-empty selectedValues arrays. In some embodiments, the device may also update the record totals, e.g., by executing method 800. The method 1000 may then end in step 1050.

If, on the other hand, the current value associated with the selected input element is not already in the selectedValues array, the method proceeds to step 1035 where the device determines whether the selectedValues array for the current attribute is currently empty and, consequently, that the associated attribute display should be moved up to the right of the last Attribute Display forming a part of the query. If so, the device moves the attribute object to a spot in the attributesArray where no preceding Attribute Objects include empty selectedValues arrays. In some embodiments, the device may also update the record totals, e.g., by executing method 800. In step 1045, the device adds the value of the selected input element to the selectedValues array, and the method 1000 proceeds to end in step 1050.

Figure 11:
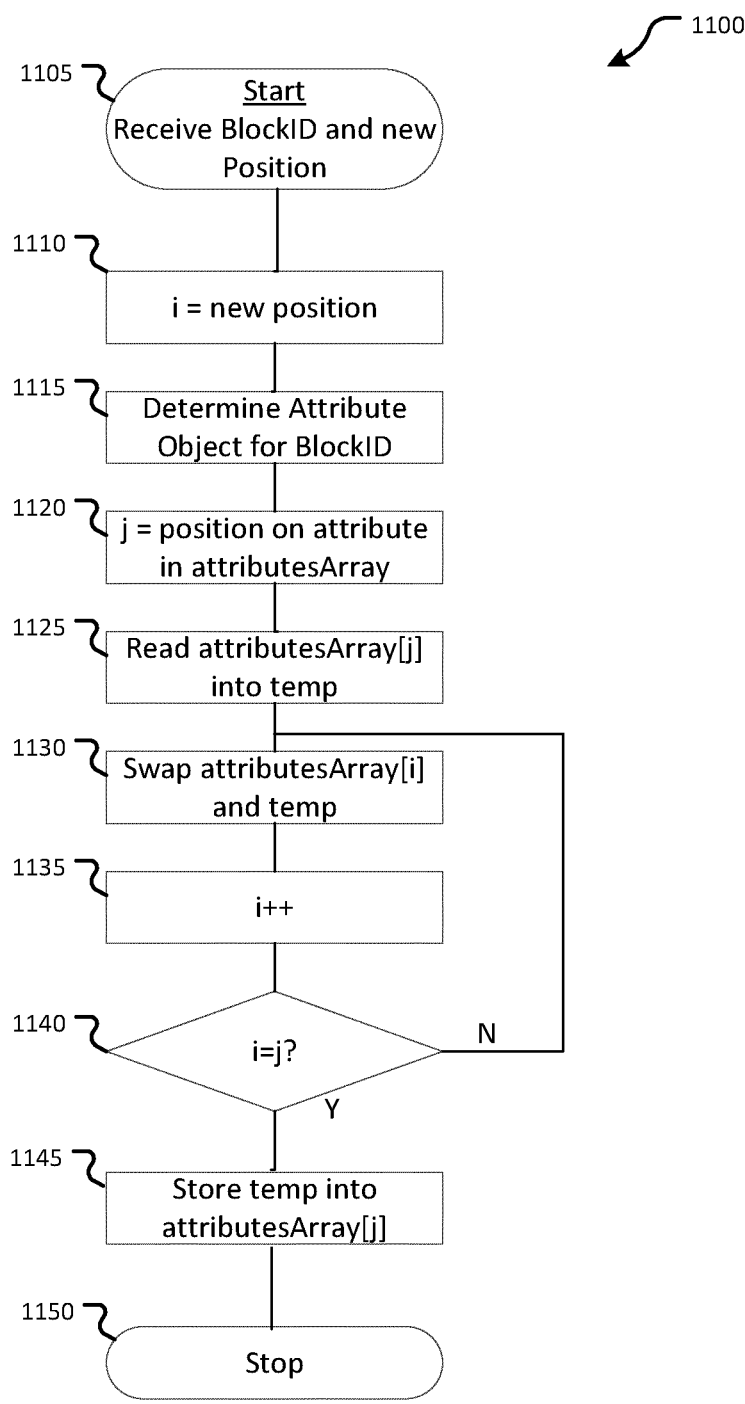
FIG. 11 illustrates an example of a method for moving columns in an interactive query interface.

FIG. 11 illustrates an example of a method 1100 for moving columns in an interactive query interface. In various embodiments, the method 1100 may correspond to step 470 of method 400 or the moveColumn(int, int) method of the Database Object. The method 1100 begins in step 1105 where the device receives two integers representing the source and destination positions of the column to be moved. In step 1110, the device initializes an index, i, to the value of the new position received by the method 1100. In step 1115, the device finds the Attribute Object for the source position and sets another index, j, equal to the position of the Attribute Object in the attributesArray. In some embodiments, this number may be the same as the received source position and step 1115 may be skipped. In step 1125, the device reads the Attribute Object at attributesArray[j] into a temporary variable. Then, in step 1130, the device swaps the temporary variable with the Attribute Object at attributesArray[i] and increments i in step 1135. The device then determines whether all appropriate Attributed Objects have been shifted by determining if the two indices, i and j, are equal. If not, the method loops back to step 1130. Once i reaches j, the method 1100 proceeds to step 1145 where the Attribute Object in temp is inserted back into the attributesArray at the $j^{th}$ position.

It will be apparent that the method 1100 is suitable for moving an Attribute Display up in the order; various modifications for moving an Attribute Display down in the order such as decrementing i in step 1135, will be apparent.

Figure 15:
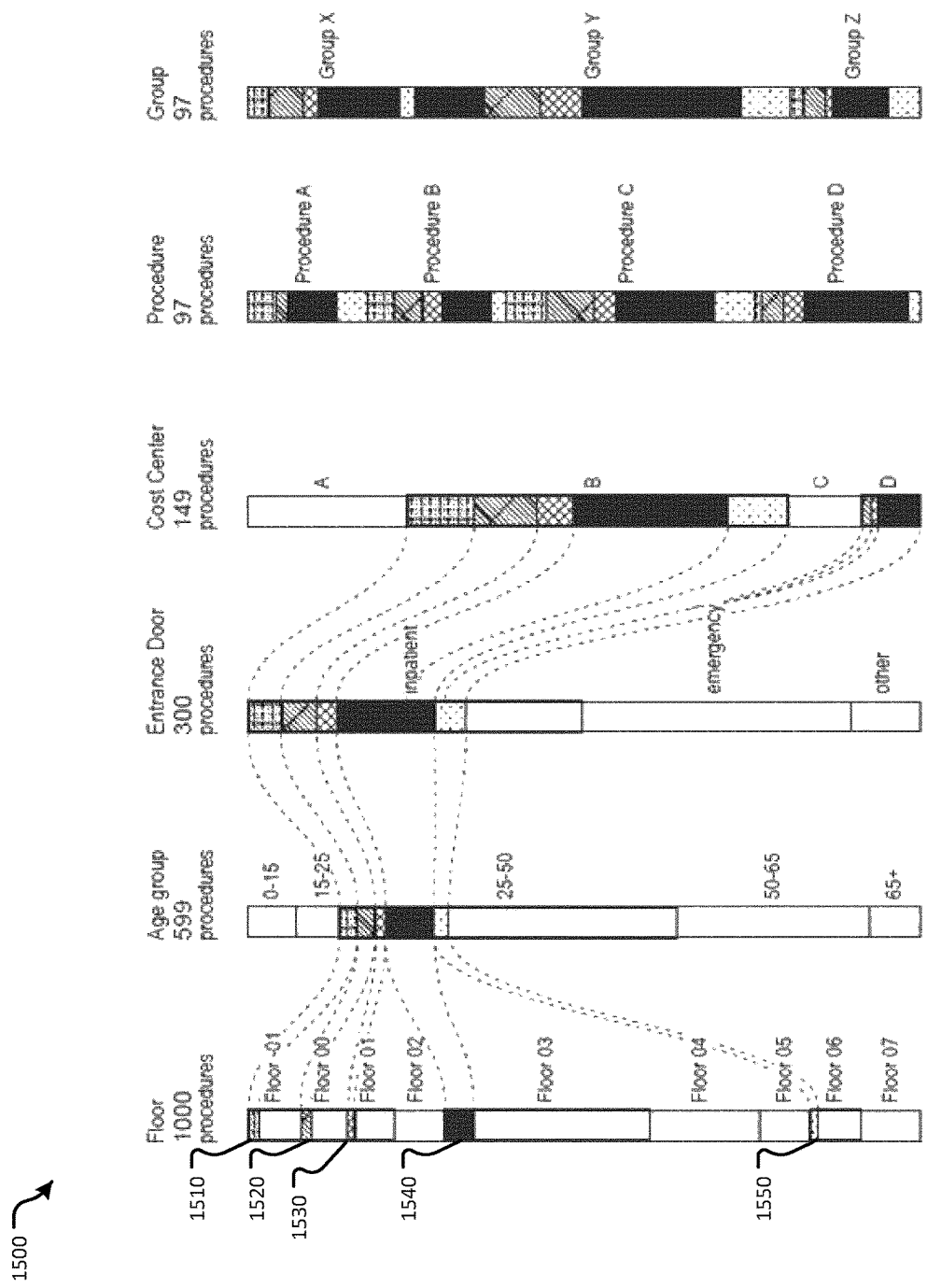
FIG. 15 illustrates an alternative embodiment of an interactive query interface.

FIG. 15 illustrates an alternative embodiment 1500 of an interactive query interface. According to this embodiment, an additional feature may be implemented to help guide the user in exploring the data set. As shown, the interface 1500 operates in a manner similar to those interfaces described above with respect to FIGS. 1-2. Interface 1500, however, includes multiple trail elements, each having a different color. In particular, each selected input element in the first Attribute Display may be associated with a single trail element of a unique color. Thus, the interface includes 5 different colored trails 1510, 1520, 1530, 1540, 1550. The user is in this manner able to visualize the proportion of each selection element that corresponds to each attribute value in the first Attribute Display. Further, the colors may also be used to show, in each Attribute Display without a selected attribute value, the proportion of each attribute value in that Attribute display matching each selected Attribute Value in the first Attribute Display. Various modifications to implement such functionality will be apparent.

It should be apparent from the foregoing description that various example embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of interactively filtering a data set based on attributes of the data set for immediate display according to a query using a graphical user interface (GUI), the method comprising:
    displaying a first attribute display in the GUI representative of a first attribute of the data set, the first attribute display comprising a plurality of first input elements respectively corresponding to a plurality of first attribute values of the first attribute, wherein each first input element comprises a selectable box having an area reflecting a proportion of records in the data set matching the corresponding first attribute value;
    displaying a second attribute display in the GUI representative of a second attribute of the data set, the second attribute display comprising a plurality of second input elements respectively corresponding to a plurality of second attribute values of the second attribute, wherein each second input element comprises a selectable box having an area reflecting a proportion of the records in the data set matching the corresponding second attribute value;
    receiving selection of a first attribute value of the plurality of first attribute values of the data set via the corresponding first input element to be included in a query of the data set;
    filtering the data set by identifying a first portion of the data set that includes the selected first attribute value using the query;
    determining remaining second attribute values of the second attribute in the first portion of the data set;
    altering each second input element of the plurality of second input elements of the second attribute display to reflect a proportion of records in the first portion of the data set matching the corresponding second attribute value;
    after altering each second input element, altering each first input element of the plurality of first input elements of the first attribute display to reflect a proportion of the records in the first portion of the data set matching the selected first attribute value and the remaining second attribute values, wherein altering each first input element comprises changing the area of the selectable box corresponding to the first input element based on the proportion of the records matching the remaining second attribute values within the first portion of the data set, and wherein the area of the selectable box is smaller than the corresponding area of the selectable box for the data set; and
    displaying a connector element extending between the first input element of the selected first attribute value and each of the second input elements of the remaining second attribute value, wherein altering each first input element comprises adjusting a dimension of each of the connector elements.

2. The method of claim 1, wherein altering the second input elements comprises removing at least one of the second input elements from the second attribute display.

3. The method of claim 1, further comprising:
    displaying, between the first attribute display and the second attribute display, a third attribute display representative of a third attribute of the data set, the third attribute display comprising a plurality of third input elements respectively corresponding to a plurality of third attribute values of the third attribute.

4. The method of claim 1, wherein the query includes another first attribute value of the plurality of first attribute values of the data set.

5. A non-transitory machine-readable storage medium for interactively filtering a data set based on attributes of the data set for immediate display according to a query, the non-transitory machine-readable storage medium comprising:
    instructions for displaying via a graphical user interface (GUI) a first attribute display representative of a first attribute of the data set, the first attribute display comprising a plurality of first input elements respectively indicating first attribute values of the first attribute, wherein each first input element comprises a selectable box having an area reflecting a proportion of records in the data set matching the corresponding first attribute value;

instructions for displaying via the GUI a second attribute display representative of a second attribute of the data set, the second attribute display comprising a plurality of second input elements respectively indicating second attribute values of the second attribute, wherein each second input element comprises a selectable box having an area reflecting a proportion of the records in the data set matching the corresponding second attribute value;

instructions for receiving a selection of a first attribute value of the plurality of first attribute values of the data set via the corresponding first input element to be included in a query of the data set;

instructions for filtering the data set by identifying a first portion of the data set that includes the selected first attribute value using the query;

instructions for determining remaining second attribute values of the second attribute in the first portion of the data set; and instructions for altering each second input element of the plurality of second input elements of the second attribute display to reflect a proportion of records in the first portion of the data set matching the corresponding second attribute value;

after altering each second input element, instructions for altering each first input element of the plurality of first input elements of the first attribute display to reflect a proportion of the records in the first portion of the data set matching the selected first attribute value and the remaining second attribute values, wherein altering each first input element comprises changing the area of the selectable box corresponding to the first input element based on the proportion of the records matching the remaining second attribute values within the first portion of the data set, and wherein the area of the selectable box is smaller than the corresponding area of the selectable box for the data set; and instructions for displaying a connector element extending between the first input element of the selected first attribute value and each of the second input elements of the remaining second attribute value, wherein altering each first input element comprises adjusting a dimension of each of the connector elements.

6. An apparatus for interactively filtering a data set based on attributes of the data set for immediate display according to a query, the apparatus comprising:

a processor;

a non-transitory memory that stores instructions executable by the processor for interactively constructing a query against the data set; and a graphical user interface (GUI) configured to transmit data for display via a display device and receive input from a user wherein, when executed by the processor, the instructions cause the processor to:

transmit data via the GUI for displaying:

a first attribute display representative of a first attribute of the data set, the first attribute display comprising a plurality of first input elements respectively corresponding to a plurality of first attribute values of the first attribute, wherein each first input element comprises a selectable box having an area reflecting a proportion of records in the data set matching the corresponding first attribute value, and a second attribute display representative of a second attribute of the data set, the second attribute display comprising a plurality of second input elements respectively corresponding to a plurality of second attribute values of the second attribute wherein each second input element comprises a selectable box having an area reflecting a proportion of the records in the data set matching the corresponding second attribute value;

receive a selection of a first attribute value for the first attribute of the data set via the corresponding first input element to be included in a query of the data set;

filter the data set by identifying a first portion of the data set that includes the selected first attribute value using the query;

determine remaining second attribute values of the second attribute in the first portion of the data set; and transmit data via the GUI for displaying altered versions of the second input elements of the second attribute display, wherein each second input element is altered to reflect a proportion of records in the first portion of the data set matching the corresponding second attribute value;

after altering each second input element, alter each first input element of the plurality of first input elements of the first attribute display to reflect a proportion of the records in the first portion of the data set matching the selected first attribute value and the remaining second attribute values, wherein altering each first input element comprises changing the area of the selectable box corresponding to the first input element based on the proportion of the records matching the remaining second attribute values within the first portion of the data set, and wherein the area of the selectable box is smaller than the corresponding area of the selectable box for the data set and display a connector element extending between the first input element of the selected first attribute value and each of the second input elements of the remaining second attribute value, wherein altering each first input element comprises adjusting a dimension of each of the connector elements.

7. The apparatus of claim 6, wherein altering each first input element comprises adjusting a dimension of each of the connector elements.

* * * * *